United States Patent [19]
Girod et al.

[11] Patent Number: 6,112,219
[45] Date of Patent: Aug. 29, 2000

[54] METHOD AND APPARATUS FOR PERFORMING FAST DISCRETE COSINE TRANSFORMS AND FAST INVERSE DISCRETE COSINE TRANSFORMS USING LOOK-UP TABLES

[75] Inventors: Bernd Girod, Köhlerhof, Germany; Staffan Ericsson, Brookline, Mass.

[73] Assignee: RealNetworks, Inc., Seattle, Wash.

[21] Appl. No.: 08/125,590

[22] Filed: Sep. 23, 1993

[51] Int. Cl.[7] .................................................. G06F 17/14
[52] U.S. Cl. ............................................................ 708/402
[58] Field of Search ..................... 364/725, 726; 708/400, 401, 402

[56] References Cited

U.S. PATENT DOCUMENTS

| | | | |
|---|---|---|---|
| 4,385,363 | 5/1983 | Widergren et al. | 364/725 |
| 4,831,574 | 5/1989 | Duhamel | 364/725 |
| 5,224,062 | 6/1993 | McMillan, Jr. et al. | 364/725 |
| 5,249,146 | 9/1993 | Uramoto et al. | 364/725 |
| 5,301,136 | 4/1994 | McMillan, Jr. et al. | 364/725 |

FOREIGN PATENT DOCUMENTS

| | | |
|---|---|---|
| 447244 | 9/1991 | European Pat. Off. . |
| 3833367 | 4/1990 | Germany . |

OTHER PUBLICATIONS

JC Carlach, P. Penard, JL Sicre, "TCAD :a 27 MHZ 3×8 Discrete Cosine Transform Chip," ICASSP '89, p. 2429–2432.

*Primary Examiner*—Ohuong Dinh Ngo
*Attorney, Agent, or Firm*—Wolf, Greenfield & Sacks, P.C.

[57] ABSTRACT

A method is provided for performing a fast Discrete Cosine Transform (DCT) and a fast Inverse Discrete Cosine Transform (IDCT) in a software implementation. The method provided exploits symmetries found in both the DCT and IDCT. As a result of the symmetries found in the DCT and IDCT, both transforms may be performed using a combination of look-up tables and butterfly operations, thus employing only a small number of additions and subtractions and no multiplications. Furthermore, there is provided an aspect of the present invention which exploits the excess precision available in current central processing units (CPUs) relative to the precision required by the DCT and IDCT calculations.

31 Claims, 11 Drawing Sheets

METHOD AND APPARATUS FOR PERFORMING FAST DISCRETE COSINE TRANSFORMS AND FAST INVERSE DISCRETE COSINE TRANSFORMS USING LOOK-UP TABLES

BACKGROUND OF THE INVENTION

The present invention relates generally to the field of digital image processing systems, in particular image processing systems implemented in software. More specifically, the present invention relates to fast implementations of the Discrete Cosine Transform and Inverse Discrete Cosine Transform suitable for embodiment in software.

BACKGROUND

In the context of the present invention, an image is a two-dimensional visual representation, wherein each point within the image may have associated therewith one or more characteristics. For example, for a monochrome image, each point may have associated therewith a luminance value. For a color image, each point may have associated therewith a red intensity, a blue intensity and a green intensity. Common image presentation technologies include printed photographic still images, movie images, television images, and computer images. Computer technology has now begun to open whole new areas of image presentation, such as high realism video games, electronic books, and others yet to reach commercialization. These later forms of image presentation all use digital images. That is, images which are stored in digital, and usually binary, form.

Digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image in a sequence which can be interpreted by a receiver of the digital image signal.

One reason that these emerging technologies have not appeared sooner is that uncompressed digital image signals contain vast amounts of information, requiring vast quantities of storage space. Furthermore, moving uncompressed digital image signals from one user to another requires a large communication bandwidth to accommodate the large amount of information in a reasonable period of time. The old saw that a picture is worth a thousand words woefully underestimates the problem. Suppose that for a monochromatic (e.g., black and white) image 256 shades of gray are sufficient to represent a uniform luminance scale ranging from black to white. Each pixel occupies eight bits (binary digits) of storage. Thus an image created for display on a typical personal computer screen having a resolution of 640×480 pixels occupies a total of 307,200 bytes. That is the storage equivalent of approximately 100 pages of single-spaced text. Extrapolating, a color image can occupy three times that storage space.

In view of the tremendous pressure that the use of images places on storage requirements, there has been a great deal of research into image compression techniques. A standard known as ISO 10918-1 JPEG Draft International Standard/CCITT Recommendation T.81 has emerged as a result of this research. The standard is reproduced in Pennebaker and Mitchell, "JPEG: Still Image Data Compression Standard," New York, Van Nostrand Reinhold, 1993, incorporated herein by reference. One compression technique defined in the JPEG standard, as well as other emerging compression standards, is Discrete Cosine Transform (DCT) coding. Images compressed using DCT coding are decompressed using an inverse transform known as the inverse DCT (IDCT). An excellent general reference on DCTs is Rao and Yip, "Discrete Cosine Transform," New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and CCITT Recommendation H.261. Both of these standards rely in part on DCT coding and IDCT decoding.

Given that processing digital image signals using DCT coding provides the desired degree of compression, the pressure on industry is now to find the fastest method by which to perform the DCT and IDCT. As in the field of compression generally, research is highly active and competitive in the field of fast DCT and fast IDCT implementation. Researchers have made a wide variety of attempts to exploit the strengths of the hardware intended to implement the DCT and IDCT by exploiting symmetries found in the transform and inverse transform. For example, Chen, Smith and Fralick proposed an early fast technique, in their paper "A Fast Computational Algorithm for the Discrete Cosine Transform," *IEEE Transactions on Communication*, COM-25(9), pp 1004–1009, September 1977. A scaled one-dimensional, 8-element DCT (1D 8-DCT) that requires only five multiplications and twenty-eight additions and subtractions was proposed in Arai, Agui and Nakajima, "A Fast DCT-SQ Scheme for Images," *Transactions of the IEICE*, E71(11), p. 1095, November 1988. However, these proposed techniques benefit greatly from implementation in special-purpose hardware. Implementations exclusively in software are only just now beginning to appear.

It is desired to implement these functions in software, because to do so reduces hardware costs. Specialized hardware embodying a software DCT/IDCT could be made more flexible than an all-hardware implementation. Software which could run on a conventional PC, without special hardware, could eliminate the cost of such hardware entirely. This may be especially advantageous in fields such as video teleconferencing, where the participants are already likely to have access to PCs. A video teleconference system could be implemented at a fraction of the cost of current special-purpose hardware.

As will be seen in the Detailed Description, below, only sixteen bits of precision are required for typical DCT/IDCT implementations. However, PCs having internal precisions of thirty-two bits and even sixty-four bits are beginning to become commonplace.

Nevertheless, fast software DCT and IDCT implementations continue to suffer, relative to their hardware cousins, due to the unusual demands placed on the computer by the required arithmetic operations, particularly multiplications. Therefore, it is a goal of the present invention to improve the speed at which software can process digital image signals using DCTs and IDCTs.

SUMMARY OF THE INVENTION

The foregoing general goal and such other goals as will make themselves apparent may be achieved in one or more aspects of the present invention. Each aspect of the present invention summarized hereafter processes digital signals from one useful form to another, different, useful form.

According to one aspect of the present invention, there is provided a method of producing an output signal including a plurality of output coefficients by performing a Discrete Cosine Transform of a digitized input signal including a plurality of samples. The method according to this aspect of the present invention is as follows. A plurality of table values is precomputed. The table values each correspond to multiplication of an input signal value by a transform basis function element so as to produce a term in one of the plurality of output coefficients. The plurality of table values are stored in the at least one look-up table. A corresponding plurality of buffers receives the plurality of digitized input signal samples. Values of the received input signal samples are used to look up in at least one look-up table entries corresponding thereto. Finally, a plurality of sums of corresponding table values are accumulated to form the plurality of output coefficients.

According to a second aspect of the present invention, there is provided another method of producing an output signal including a plurality of output coefficients by performing a Discrete Cosine Transform of a digitized input signal including a plurality of samples. The method according to this aspect of the present invention is as follows.

A set of table values are precomputed, the at least one look-up table stored, and the input values received as before. However, the received plurality of input signal samples are decomposed into an odd portion including a plurality of odd values and an even portion including a plurality of even values. Therefore, the look-up tables precomputed in accordance with the second aspect of the present invention differ from those computed for the first aspect discussed above. It should be noted that the decomposition may be performed, for example, by executing a vector butterfly on the plurality of input values. After decomposition, each one of the plurality of odd values is used to look up entries in the at least one look-up table. Each entry contains a plurality of output values corresponding to odd output coefficients. The odd output coefficients are accumulated as a plurality of sums of corresponding table values. Finally, the even portion of the plurality of output coefficients is computed.

A method according to yet another aspect of the present invention computes the even portion of the plurality of output coefficients as follows. Entries corresponding to the plurality of even values are looked up in the at least one look-up table. Then, even output coefficients are accumulated as sums of corresponding table values.

According to yet another aspect of the present invention, the computation of the even portion of the output coefficients may be performed as follows. The plurality of even values is further recomposed into a plurality of even-even values and a plurality of even-odd values. A butterfly operation is performed on the plurality of even-even values. Entries corresponding to the plurality of even-odd values are looked up in the at least one look-up table. Finally, an even-odd portion of the plurality of output coefficients is accumulated as a plurality of sums of corresponding table values.

The table values precomputed in accordance with one aspect of the present invention may differ from those precomputed in accordance with the other aspects of the present invention.

According to an aspect of the present invention, combinable with those discussed above, the invention may include producing an output signal having a plurality of digitized signal samples by performing an Inverse Discrete Cosine Transform or another similar transform of an input signal including a plurality of input coefficients. Steps in accordance with this aspect of the present invention may include the following. A plurality of table values are precomputed, each table value corresponding to multiplication of an input coefficient value by a transform basis vector element so as to produce a term in one of the plurality of output signal samples. At least one look-up table containing a plurality of entries having a plurality of the table values is stored in a memory. The plurality of input coefficients are then received into a corresponding plurality of buffers. Entries corresponding to the plurality of received input coefficients are then looked up in the at least one look-up table. The plurality of output signal samples are accumulated to form a plurality of sums of table values corresponding to each output signal sample. The step of accumulating may further include forming the summing results segregated by symmetry class of the input coefficients, and performing at least one vector butterfly operation corresponding to the plurality of symmetry classes, so as to combine segregated results into the output signal.

The present invention, including aspects discussed above may be practiced in the form of a digital image processing apparatus or in the form of a video conferencing system employing digital image processing techniques.

Aspects of the present invention may be practiced using transforms other than DCT/IDCT, since some aspects of the invention are applicable to matrix multiplication generally in computers and particularly in image processing. For example, some aspects of the invention exploiting even-odd symmetries may be practiced where the transform is the Discrete Sine Transform, the Hadamard Transform, and the Discrete Fourier Transform. Some aspects of the invention which do not exploit even-odd symmetries may be practiced where the transform is the Karhunen-Toève transform.

Aspects of the present invention may be practiced in other applications of matrix multiplication in computers and in image processing, such as implementations of digital finite impulse response filters.

Embodiments of the invention will now be discussed in connection with the Figures.

BRIEF DESCRIPTION OF THE DRAWING

Like reference numerals indicate like elements in the Figures, in which.

DETAILED DESCRIPTION

The present invention will be better understood in view of the following description, read in connection with the figures.

Figure 1:
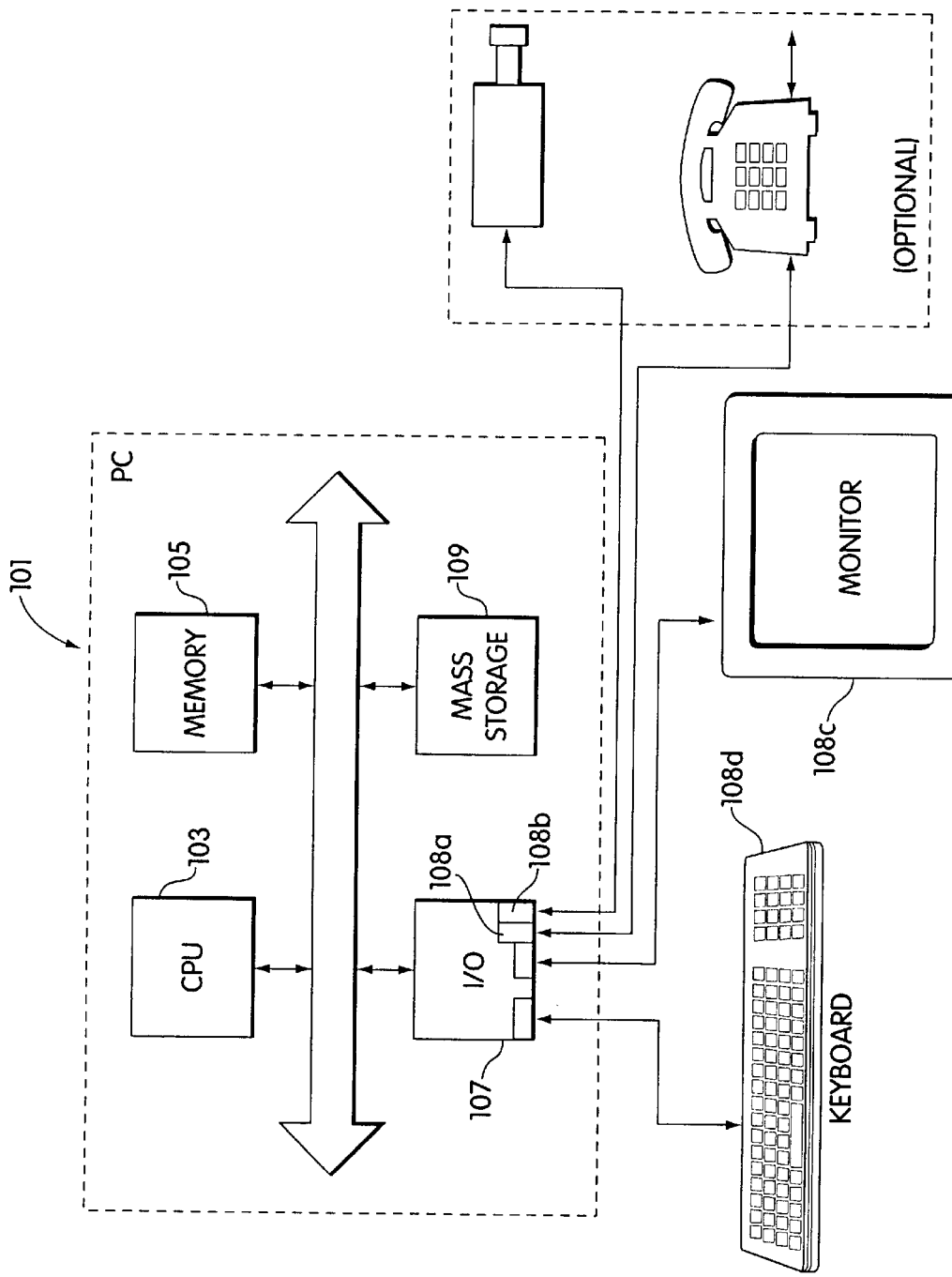
FIG. 1 is a block diagram of a computer system suitable for practicing the present invention.

The embodiments and variations disclosed herein are all intended to be implemented in the form of software running on a personal computer (PC), configured substantially as shown in FIG. 1. However, the specific hardware configuration is not a limitation of the present invention. Indeed, the invention could be embodied in software running on other types of general-purpose computers, or embodied in special-purpose integrated circuits. However, the PC configuration of FIG. 1 illustrates the general hardware parameters suitable for practicing the invention, without unduly complicating the detailed explanation thereof.

Referring to FIG. 1, the PC 101 includes a central processing unit (CPU) 103, memory 105, input/output (I/O) system 107 and mass storage 109. These are now briefly discussed, before turning to the software of the present invention.

The CPU 103 should preferably be of a type having an internal precision and register size of at least thirty-two bits, such as the Intel 486 family or Motorola 68040 devices. Alternatively, the CPU 103 can be a 64-bit precision device, such as a Digital Equipment Corp. Alpha or a MIPS R4000. The minimum processing speed is not a critical parameter, but may be chosen by the skilled designer. Naturally, differences in processing speed will have a direct effect on the performance of different systems.

Having sufficient quantities of memory 105 available in the PC 101 will also have a direct effect on system performance. As will be seen below, it is desirable to be able to hold sufficient quantities of a digital input signal and a digital output signal, as well as certain program structures, such as look-up tables used in transforming the input signal into the output signal. The PC 101 therefore preferably includes several megabytes (M bytes) of RAM, as well as other forms of memory, such as operating system ROM, which is not important to this description. (1M bytes=1,048, 576 bytes.) Data and digital signals of various kinds may be passed into or out of PC 101 through I/O system 107. An extremely wide variety of devices may be included in I/O system 107. The devices of I/O system 107 allow digital image signals to be received into or transmitted out of PC 101. For example, I/O system 107 may include a modem 108*a* for sending digital signals or receiving digital signals or data from remote devices and computers. Such digital signals could include digital image signals. Another possible I/O device is a frame grabber 108*b,* which could be used to introduce into PC 101 television or video images which have been converted to digital form. Of course, I/O system 107 may include such conventional I/O devices as a monitor 108*c,* keyboard 108*d* and printer (not shown), which may be desirable.

Programs, data and digital signals which need to be stored on a more permanent basis than permitted by the RAM portion of memory 105 are stored in a mass storage device 109. The mass storage device 109 may be a hard disk, an optical disk, a CD-ROM or any permanent storage device having similar characteristics to the devices mentioned.

Image signals are received into the PC 101 through one of the devices of I/O system 107. Once inside the PC 101, the image signals will have been converted to digital form. That is, they are digital image signals. In this embodiment, it is presumed that the digital image signals are to be either stored in a mass storage device 109 or transmitted to another location via one of the I/O devices of the I/O system 107. It is further presumed in this embodiment that subsequently the digital image signals are to be used to operate a display device, for example the monitor 108*c,* to display the image in its customary form. One example of this is where the PC 101 is part of a conferencing network where images are to be exchanged, stored and displayed on a plurality of such machines. The methods and apparatus next described relate primarily to a portion of the conversion of the digital image signal into a compressed signal suitable for storage or transmission and reconversion of the compressed signal back to a digital image signal suitable for operating a display device.

Methods according to the present invention are now described in connection with 1D 8-DCTs. Thus the input signal and output signal will be treated in groups of eight signal samples. Extension of the methods described to two-dimensional DCTs will be explained below. Extension of the methods described to other numbers of input samples should be evident to those skilled in the art.

The 1D 8-DCT is an orthogonal transformation. A detailed discussion of the mathematics of DCTs may be found in Rao and Yip, as noted above. However, for the following discussion it will suffice to observe that the 1D 8-DCT may be represented mathematically as the following matrix multiplication:

$$c = A \cdot s. \qquad (1)$$

The input samples and output coefficients, are represented by eight-dimensional column vectors s and c, respectively. Thus, s and c may be represented as:

$$s = \begin{vmatrix} s_0 \\ s_1 \\ \vdots \\ s_7 \end{vmatrix}; c = \begin{vmatrix} c_0 \\ c_1 \\ \vdots \\ c_7 \end{vmatrix}.$$

The matrix A is an 8×8 matrix, whose coefficients will be readily calculated by those skilled in this art. The coefficients of matrix A are the coefficients of the transform basis functions of the 1D 8-DCT.

$$A = \begin{vmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{vmatrix}$$

According to equation (1), 64 multiplications are required to compute the 1D 8-DCT. However, due to the modest sizes of the matrix and vectors involved, each element of input vector s may be associated with a look-up table containing the precomputed results of multiplying all possible values for each input sample si by the appropriate column of matrix A. A precision of eight bits for input samples si is typical. Therefore, there are 256 possible input sample values. Thus, in this embodiment, each look-up table associated with an input sample si contains 256 entries. For this embodiment, each of the 256 entries contains the eight output values corresponding to the multiplication of the input sample si by each transform basis function elements in the appropriate column of matrix A. Each output value produced by a look-up table entry corresponds to the contribution of input sample si to one element of output vector c. The contributions for each input sample si are then summed to produce each output coefficient c in accordance with conventional rules for performing multiplication of a matrix by a vector.

The method according to this aspect of the present invention is further explained in connection with the signal flow graph of FIG. 2. Input samples $s_0, s_1, \ldots, s_7$ are held in input buffers 201a, 201b, ..., 201h. The values held in the input buffers 201 are then applied as addresses of look-up tables LUT0, LUT1, ..., LUT7, the look-up tables corresponding to the input values $s_0, s_1, \ldots, s_7$. Each look-up table provides 8 output values, the 8 output values corresponding to the contribution of the input sample $s_i$ associated therewith to output coefficients $c_0, c_1, \ldots, C_y$. For example, the look-up table LUT0 produces output values 203a, 203b, ..., 203h. Summing junctions 205a, 205b, ..., 205h sum the contributions from each look-up table, so as to provide output coefficients $c_0, c_1, \ldots, C_7$.

The amount of storage required to hold the look-up tables is now calculated. Input samples having a precision of eight bits have been assumed, as above. Thus, the dimensions of each look-up table are 256 entries×8 output values=2,048 values in each look-up table. It will be further assumed that each output value is stored with a precision of sixteen bits, or two bytes. Thus, the size of the table in bytes is 256×8×2=4,096 bytes. Finally, the method according to this aspect of the present invention employs eight look-up tables. Thus, the total look-up table storage required is 256×8×2×8=32 k bytes (1 k bytes=1,024 bytes).

The method according to this aspect of the present invention requires a relatively small amount of computing power, at the expense of only 32 k bytes of memory. This method does not perform any actual multiplications during the calculation of the DCT, since those have been precomputed and stored in the look-up tables. The method does perform fifty-six additions of the terms provided by the look-up tables, so as to form the eight output coefficients $c_i$. There are several variations of the methods disclosed herein which permit either a reduction in the size of the look-up tables or a reduction in the number of computations required. For simplicity of explanation, these variations are now described in connection with the foregoing method. However, it will be evident that these variations are intended to be practiced in connection with any of the methods disclosed herein.

The first variation is a way of reducing the size of the look-up tables by storing in the tables only once those table values which may appear at more than one location in the basis function matrix. This variation is known as reusing table values. For example, ignoring the difference in sign, inspection of the matrix A reveals that pairs of columns of the matrix include elements having identical magnitudes. Particularly, the first and last columns are identical, except as to sign, as are the second and seventh, third and sixth, and fourth and fifth. Thus, only the first column need be stored to produce all the values required by the first and eighth columns. The sign differences between the values in the eighth column and the values stored for the first column may be corrected when the final summation is performed. Each pair of columns with matching magnitude values may be treated similarly, thus halving the number of look-up tables, as follows.

Only one look-up table need be stored for both s and because those input signal samples address look-up tables corresponding to columns one and eight of the matrix A. When addressed by input sample $s_7$, the values corresponding to the odd output coefficients $c_1, c_3, c_5$ and $c_7$ would be subtracted from their respective accumulators, in order to provide values having the correct sign. Further inspection of matrix A reveals that all contributions to the odd output coefficients by columns five through eight are subtracted in order to correct their sign relative to columns one through four. Therefore, the sign correction may be built into the accumulator software or hardware for the odd coefficients.

In a second variation, the number of additions performed may be reduced by exploiting the difference between the precision required by the calculations, typically 16 bits or less, and that provided by commonly available CPUs, typically 32 bits or 64 bits. Although this aspect of the present invention, called parallel accumulation, is described in relation to 32-bit CPUs, it will be readily apparent to those skilled in the art how it can be practiced on 64-bit CPUs as well as other size CPUs.

Figure 9:
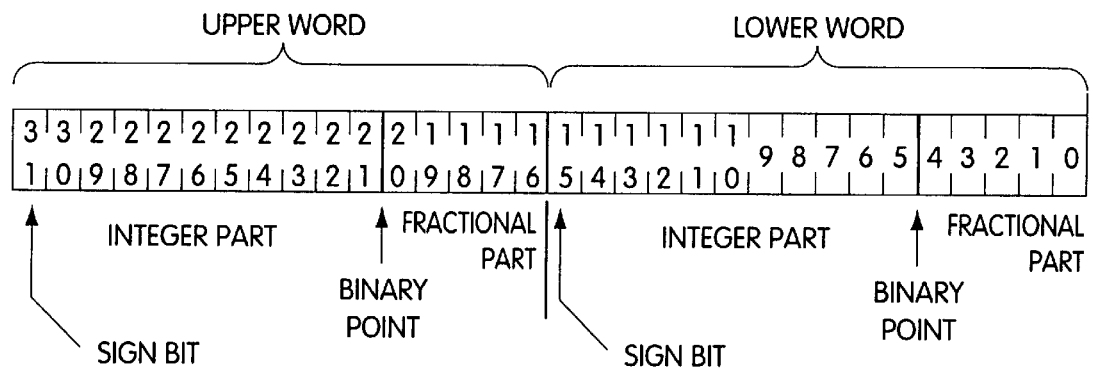
FIG. 9 is a register allocation diagram illustrating parallel accumulation.

For the purposes of the following description, it has been assumed that adequate output range from the look-up tables is provided by 8 integer bits in the two's complement notation. As seen in FIG. 2, each summing node 205 will accumulate eight such values. Therefore, the sum may include carries which accumulate out to eleven bits. Each of the eight values is the product of an integer and a fraction, such as shown in the entries of matrix A. In order to reduce the variance of the rounding error, it is preferable to store the look-up table values with both an integer part and a fractional part, and only perform rounding to the nearest integer after accumulation is complete. FIG. 9 illustrates a single 32-bit register holding two values. Both the upper word and lower word contained in the register of FIG. 9 have 11-bit integer parts. The lower word has a binary point between bits four and five, followed by a fractional part of five bits. The upper word has a binary point between bits twenty and twenty-one, followed by a 5-bit fractional part. Look-up table values may be stored in such a way as to fit the template of FIG. 9. Look-up table values would be loaded by pairs into the lower word and the upper word of such a 32-bit register, and subsequently accumulated in pairs. For example, the output values of look-up table LUT0 corresponding to output coefficients $c_0$ and $c_1$ produced by look-up table LUT0 would be stored as a single 32-bit value matching the template of FIG. 9, such that the value corresponding to $c_0$ would be in the lower word of the 32-bit register and the value corresponding to $c_1$ would be in the upper word of the 32-bit register. Then, an output value from look-up table LUT1, having the output values corresponding to $c_0$ and $c_1$ arranged similarly is simply added to the register containing the values previously loaded from look-up table LUT0. The above procedure is repeated until all eight values corresponding to each of $c_0$ and $c_1$ have been accumulated in the single 32-bit register.

It will be observed that no guard band is provided between the lower word and the upper word, but up to three bits of overflow can occur in each of the additions. If only positive values appear in the lower word, then the overflow merely increases the integer from seven bits to ten. However, if one or more negative numbers j appear in the lower word, then the up to three bits of overflow may corrupt the lower three bits of the fractional part of the upper word. This is because the two's complement negative numbers will have their highest-order bits set. Adding two negative numbers in the lower word thus overflows into the fractional part of the upper word. The error introduced by this overflow is minimized as follows. First, the next stage of signal processing may only use the integer part of the values computed, as noted in the assumptions above. The fractional part would be retained only to minimize the variance of the rounding error, which would be larger if the look-up table values were each individually rounded to their integer parts. Second, one of the look-up tables, for example, LUT7 may incorporate a bias in its output values, which both effects proper rounding and compensates for the expected overflow. That is, the lower word of the output values of look-up table LUT7 may be biased up by +0.5, so that truncating the lower word to only its integer part results in rounding to the nearest integer. The upper word of the output values of look-up table LUT7 may be biased up by +0.5, less the value of the lower word viewed as additional fractional bits of the upper word. Moreover, the upper words of each output value of each look-up table LUT0–LUT6 may be decreased by the value of the lower word viewed as additional fractional bits of the upper word. For example, suppose one of the 32-bit output values contain halfwords representing [17.44001|–16.0000]. In 32-bit binary, two's complement notation, the values are represented as 00000010001.01110000101000100000 and 11111110000.00000000000000000000. The two values are to be rounded to five digits to the right of the binary point, and located in adjacent 16-bit halfwords of the 32-bit output value. Viewing the lower half word as located in bits six, seven, etc. to the right of the binary point, the lower half word may be subtracted from the upper half word, as follows:

$$\begin{array}{r} 10001.01110000101000100000 \\ -00000.00000111111100000000 \\ \hline = 10001.01101000101100100000 \end{array}$$

This result is rounded to the five digits to the right of the binary point which are available in the table and accumulator register, as shown in FIG. 9. It will be observed that the effect on the upper half word of small positive numbers in the lower half word will be negligible, while the effect on the upper half word of small negative numbers in the lower half word will be to decrease the upper half word by 0.00001 prior to insertion in the look-up table. Of course, changing the number of bits in each half word which lie to the right of the binary point will change this result correspondingly. Rounding the upper word to the nearest integer after this type of compensation gives good results. Furthermore, since the next step of signal processing will usually be a quantization step, where intervals of integers are then grouped and each assigned a quantized signal value, any residual error is further minimized.

Retrieving the values produced by such a parallel accumulation is a relatively simple matter for modern CPUs. One method is described here. The lower word is retrieved by masking out the upper sixteen bits shifting right five bits and sign extending the result. This retrieves the integer part of the lower word. To retrieve the upper word, the register value is simply shifted right twenty-one bits. The shifts are preferably performed using a barrel shifter, such as is common in modern CPUs. Alternatively, the register may be written as a 32-bit word to a location in RAM and subsequently read on 16-bit boundaries. This latter technique is particularly suitable where subsequent processing, such as quantizing will receive an array of such output values.

This example was given using equal word lengths and integer precisions. However, it may be readily extended to cases where the word length and the binary point of the upper half word differs from those of the lower half word and to cases where more than two values are processed in one register.

In a third variation, the statistical properties of the expected inputs may be exploited. In many applications, the statistics are such that the input values tend to be concentrated near zero. Thus, a vernier technique may be used to reduce the size of the look-up tables. If the input samples are represented by m bits, and if the vernier technique is not used, then each look-up table contains $2^m$ entries. However, if a vernier technique using a fine table addressed by the k least significant bits of the input and a coarse table addressed by the remaining m–k bits of the input, then the combined size of the two tables is merely $2^k+2^{m-k}$ entries.

Figure 11:
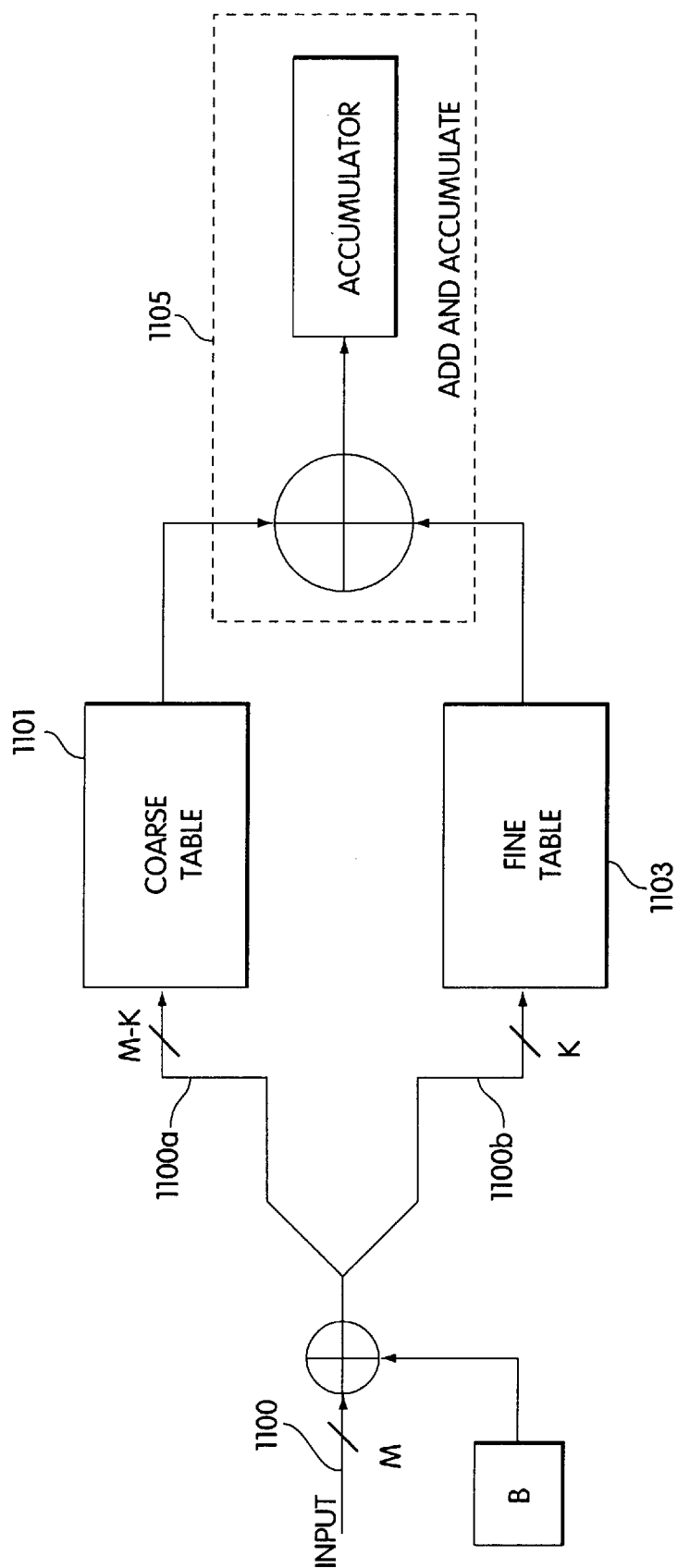
FIG. 11 is a block diagram of a vernier look-up table system.

The vernier technique is shown in FIG. 11 and implemented as follows: Each input 1100 is divided into two values, after first adding a bias B to the input 1100. If the input 1100 is an unsigned number, then the bias B is zero; but if the input 1100 is a signed number, then the bias B is preferably $2^{k-1}$. The upper m–k bits of the biased input 1100a are used as the address to the coarse table 1101, while the lower k bits of the biased input 1100b are used as the address to the fine table. If the upper m–k bits are zero, i.e. the input 1100 has a value x, such that $-B \leq x < 2^k - B$, then the table look-up and subsequent arithmetic processing of the coarse table value may be omitted. The lower k bits are used to obtain the required value from the fine table. If the upper m–k bits of the biased input value represent a non-zero value, then a value is output from the coarse table to an output accumulator and added 1105 to an output from the fine table, responsive to the k lower order bits.

The value of k may be chosen such that the input to the coarse table is zero most of the time, and therefore only the fine table is used most of the time. Many modern CPUs include a very fast local RAM called a processor cache, for temporary storage of frequently needed data. Since the above technique keeps the total table size quite small, the technique results in more cache hits, because the needed values from both the fine table and the coarse table tend to remain in the processor cache.

There are several statistical reasons why k may be chosen to be small. In one method of processing a digital image signal for motion pictures, a difference signal representing differences between each frame of the motion picture and the preceding frame of the motion picture is created. It is the difference signal which is to be transformed using the DCT. Since such differences tend to be small, the input signal samples likewise tend to be small. Therefore, in such systems k may be chosen to be small. Furthermore, as seen below in connection with methods related to IDCTs, the DCT coefficients input to an IDCT also tend to be small. Therefore, a significant reduction in table size is achieved.

Figure 10:
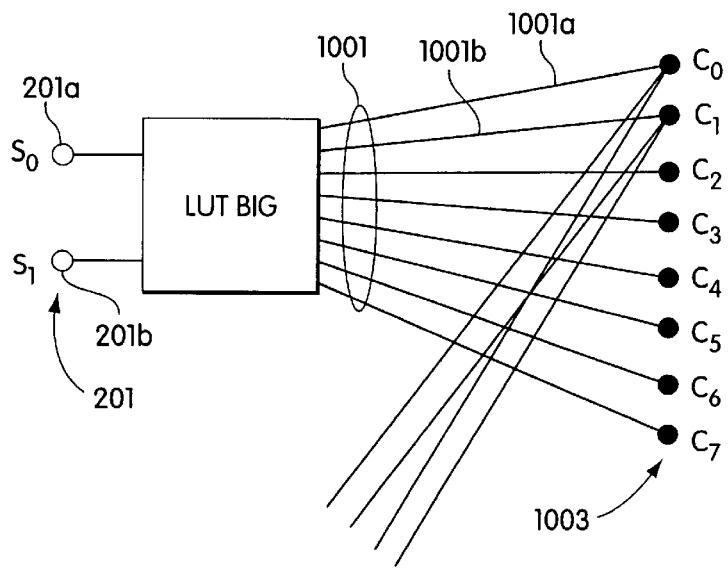
FIG. 10 is a partial signal flow graph illustrating a combined look-1. table.

In accordance with a fourth variation, it is possible to combine look-up tables in pairs or larger groups, forming multiple-entry tables on the basis of the input values. Referring to FIGS. 2 and 10, for example, look-up tables LUT0 and LUT1 of FIG. 2 may be combined to form LUTbig.

The inputs to LUTbig are both $s_0$ and $s_1$. Therefore, the number of entries in LUTbig is the square of the number of entries in either LUT0 or LUT1. However, each entry of LUTbig contains eight output values 1001, each of which is the sum of the output of LUT0 and the output of LUT1 corresponding to a combination of input values $s_0$ and $s_1$. For example, an output value 1001$a$ corresponding to coefficient $c_0$ is produced, which is the contribution of both $s_0$ and $s_1$ to output coefficient $c_0$. Therefore, summing nodes 1003 each only perform three additions, combining values from each of four paired look-up tables. This variation compares to the method of the first aspect of the present invention as follows. The basic method required 32 k bytes of look-up table storage, eight table look-ups and fifty-six additions and subtractions. In accordance with this variation, the look-up tables have been increased in size to:

64k entries×8 values/entry×2 bytes/value×4 tables=4M bytes, but required only four table look-ups and twenty-four additions and subtractions.

Clearly, the above four variations may be combined in various advantageous ways. For example, look-up tables may be combined in order to reduce the total number of arithmetic operations, while simultaneously using the Vernier technique to reduce the size of such look-up tables.

Other various combinations may now be apparent to those skilled in the art, in view of the foregoing description.

In accordance with another aspect of the present invention, symmetries in matrix A can also be exploited to further reduce the computing power required to perform the DCT. One type of symmetry present in matrix A is known as even/odd symmetry. Even/odd symmetry permits the matrix A to be decomposed into two matrices, D and B, where the decomposition matrix D is:

$$D = \begin{vmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{vmatrix}, \text{ and}$$

the residue of A after decomposition, B is:

$$B = \begin{vmatrix} 0.3536 & 0.3536 & 0.3536 & 0.3536 & 0 & 0 & 0 & 0 \\ 0 & 0 & 0 & 0 & 0.0975 & 0.2778 & 0.4157 & 0.4904 \\ 0.4619 & 0.1913 & -0.1913 & -0.4619 & 0 & 0 & 0 & 0 \\ 0 & 0 & 0 & 0 & -0.2778 & -0.4904 & -0.0975 & 0.4157 \\ 0.3536 & -0.3536 & -0.3536 & 0.3536 & 0 & 0 & 0 & 0 \\ 0 & 0 & 0 & 0 & 0.4157 & 0.0975 & -0.4904 & 0.2778 \\ 0.1913 & -0.4619 & 0.4619 & -0.1913 & 0 & 0 & 0 & 0 \\ 0 & 0 & 0 & 0 & -0.4904 & 0.4157 & -0.2778 & 0.0975 \end{vmatrix}.$$

In view of the above decomposition of the matrix A, equation (1) can now be rewritten as follows:

$$c = B \cdot (D \cdot s). \quad (2)$$

It readily will be seen that the product (D·s) may be obtained using only additions and subtractions. In fact, it is a vector butterfly, performed on the upper and lower half-vectors of s, $[s_0\ s_1\ s_2\ s_3]^T$ and $[s_4\ s_5\ s_6\ s_7]^T$. The result of the vector butterfly D·s is a four-dimensional vector e containing the even portion of the input signal and a four-dimensional vector o containing the odd portion of the input signal.

The matrix B only contains 32 non-zero entries. Due to the peculiar structure of this matrix, it may be further broken down into two 4×4 matrixes, $B_e$ and $B_o$, whereby the product $B_e \cdot e$ gives output coefficients $c_0$, $c_2$, $c_4$, and $c_6$, while the product $B_o \cdot o$ gives output coefficients $c_1$, $c_3$, $c_5$, and $c_7$. The matrix $B_e$ contains the non-zero coefficients of the left half of the matrix B, while the matrix $B_o$ contains the non-zero coefficients of the right half of the matrix B. The matrices $B_e$ and $B_o$ are represented as follows:

$$B_e = \begin{vmatrix} 0.3536 & 0.3536 & 0.3536 & 0.3536 \\ 0.4619 & 0.1913 & -0.1913 & -0.4619 \\ 0.3536 & -0.3536 & -0.3536 & 0.3536 \\ 0.1913 & -0.4619 & 0.4619 & -0.1913 \end{vmatrix}, \text{ and}$$

$$B_o = \begin{vmatrix} 0.0975 & 0.2778 & 0.4157 & 0.4904 \\ -0.2778 & -0.4904 & -0.0975 & 0.4157 \\ 0.4157 & 0.0975 & -0.4904 & 0.2778 \\ -0.4904 & 0.4157 & -0.2778 & 0.0975 \end{vmatrix}.$$

Equation (2) may now be rewritten as the following system of equations:

$$\begin{vmatrix} e \\ o \end{vmatrix} = D \cdot s; \tag{3}$$

$$\begin{vmatrix} c_0 \\ c_2 \\ c_4 \\ c_6 \end{vmatrix} = B_e \cdot e; \text{ and}$$

$$\begin{vmatrix} c_1 \\ c_3 \\ c_5 \\ c_7 \end{vmatrix} = B_o \cdot o.$$

Figure 3A:
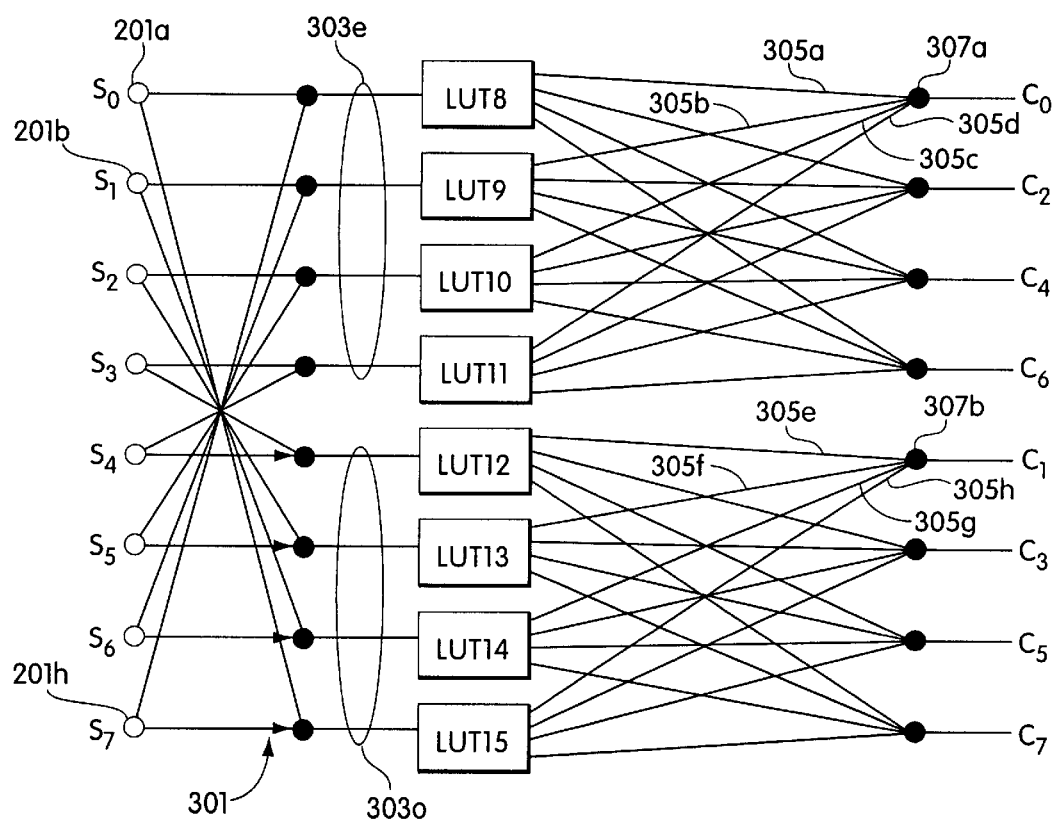
FIGS. 3A and 3B are signal flow graphs of a DCT method according to another aspect of the present invention, employing even/odd decomposition and eight look-up tables.
Figure 3B:
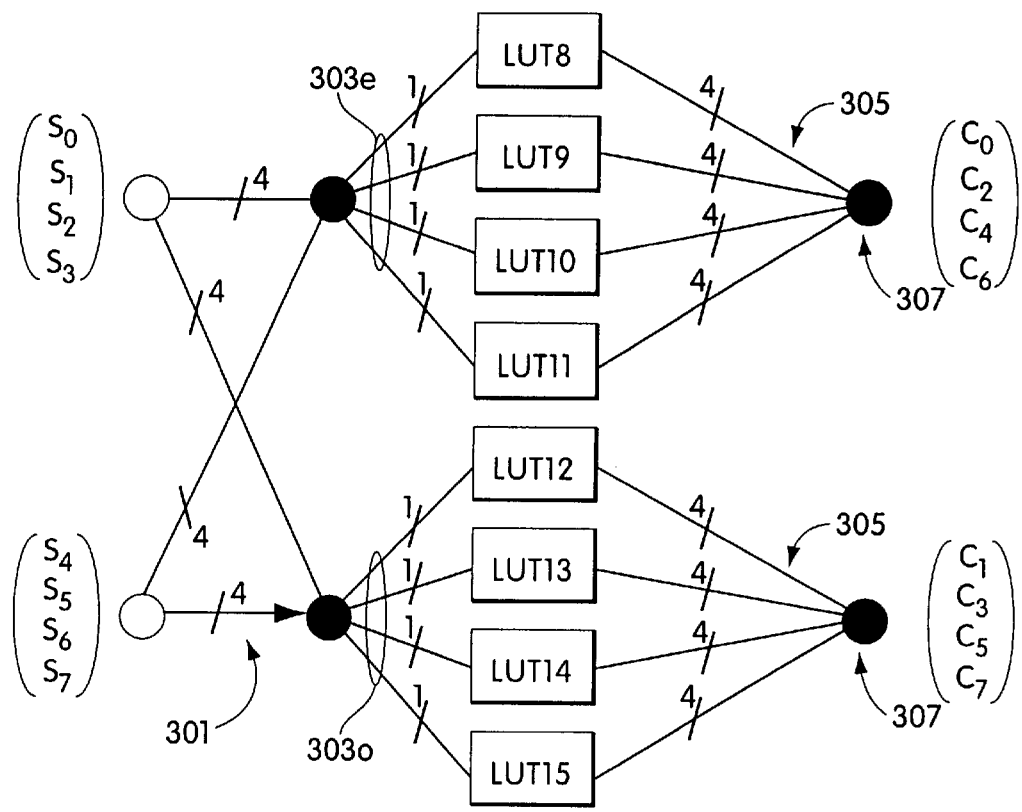

The method according to this aspect of the present invention is now described in greater detail in connection with FIGS. 3A and 3B. FIGS. 3A and 3B are both signal flow graphs of a method according to this aspect of the present invention implementing the system of equations (3).

As in the method described in connection with FIG. 2, input signal samples $s_0, s_1, \ldots, s_7$ are received into buffers 201a, 201b, ..., 201h. A series of additions and subtractions are performed on pairs of input signal samples $s_i$. Vector butterfly 301 may be represented as additions and subtractions performed on the scalar elements of input signal vector s, as shown in FIG. 3A, or may be represented as a vector operation performed on the upper and lower half-vectors of input signal vector s discussed above, as shown in FIG. 3B. In both FIGS. 3A and 3B, arrowheads indicate subtraction. In FIG. 3B, the numbers adjacent to the slashes indicate the dimension of the vector thus represented. FIGS. 3A and 3B are identical, except for this notational difference.

The result of the vector butterfly is vectors e 303e and o 303o, representing the even and odd portions of the input signal vector s, respectively. The elements of e are then applied as addresses to look-up tables LUT8, LUT9, LUT10, and LUT11, which are precalculated to give outputs corresponding to the multiplication $B_e \cdot e$. Likewise, the elements of o are then applied as addresses to look-up tables LUT12, LUT13, LUT14, and LUT15, which are precalculated to give outputs corresponding to the multiplication $B_o \cdot o$. Each output coefficient $c_0$, $c_2$, $c_4$, and $c_6$ is calculated by summing one set of four values produced by look-up tables LUT8, LUT9, LUT10, and LUT11. For example, $c_0$ is produced by summing values 305a, 305b, 305c, and 305d at the summing node 307a. Each output coefficient $c_1$, $c_3$, $c_5$, and $c_7$ is calculated by summing one set of four values produced by look-up tables LUT12, LUT13, LUT14, and LUT15. For example, $c_1$ is produced by summing values 305e, 305f, 305g, and 305h at the summing node 307b. Similar operations produce each output coefficient $c_i$.

The computational efficiency of this aspect of the present invention is as follows. Each scalar output of the vector butterfly operation has a precision which is one bit greater than the precision of the input. That is, if each input sample $s_i$ has a precision of eight bits (i.e., may take on 256 different amplitudes), then the scalar quantities resulting from the vector butterfly may take on 511 different amplitudes therefore requiring a precision of nine bits. Thus, the table space required is now:

512 entries/table×8 tables×4 output values/entry×2 bytes/output value=32 k bytes.

Although 64 bytes could be saved by using only 511 entries, practical implementations often allocate 512 entries because that is the address space addressable by nine bits. However, the number of additions and subtractions has been reduced to thirty-two.

This aspect of the present invention may be combined with any one or more of the variations described above with respect to the first aspect of the invention. That is, the look-up tables may be reduced in size by reuse of values, parallel accumulation may reduce the number of additions and subtractions required, the vernier technique may reduce table sizes, and multiple-entry tables-may reduce the number of table look-ups and additions required. How to apply each of these variations to this aspect of the present invention should be apparent to those skilled in the art, in view of the explanation given above with respect to the first aspect of the present invention.

In accordance with yet another aspect of the present invention, symmetry and even/odd decomposition may be exploited further, to yield even greater computational efficiency. Examination of matrix $B_e$, described above, will show that look-up tables LUT8–LUT11 implement a 1D 4-DCT. Therefore, the symmetries inherent in the 1D 4-DCT may be exploited by decomposing the vector e into even and odd parts, $e_e$ and $e_o$ respectively. The result of this decomposition is that the transformation of the $e_e$ portion may be accomplished by a simple butterfly operation using only additions and subtractions, while the transformation of the $e_o$ portion may be accomplished using look-up tables, much as described above. Those skilled in the art will recognize that the simple butterfly will produce output values that differ from the values of an 8-DCT by a constant scale factor of √8. However, the constant can simply be absorbed in a subsequent step involving the affected coefficients or can alternatively be factored out of each of the look-up tables. Reference designations of the form "x'" denote quantities or tables which have been scaled by the factor √8.

The system of equations (3) may now be rewritten as the following system of equations.

$$\begin{vmatrix} e \\ o \end{vmatrix} = D \cdot s; \tag{4}$$

$$\begin{vmatrix} e_e \\ e_o \end{vmatrix} = \begin{vmatrix} 1 & 0 & 0 & 1 \\ 0 & 1 & 1 & 0 \\ 0 & 1 & -1 & 0 \\ 1 & 0 & 0 & -1 \end{vmatrix} \cdot e$$

$$\begin{vmatrix} c_0 \\ c_4 \end{vmatrix} = \frac{1}{\sqrt{8}} \begin{vmatrix} 1 & 1 \\ 1 & -1 \end{vmatrix} \cdot e_e;$$

$$\begin{vmatrix} c_2 \\ c_6 \end{vmatrix} = \begin{vmatrix} 0.1913 & 0.4619 \\ -0.4619 & 0.1913 \end{vmatrix} \cdot e_o; \text{ and}$$

$$\begin{vmatrix} c_1 \\ c_3 \\ c_5 \\ c_7 \end{vmatrix} = B_o \cdot o.$$

Multiplying both sides of the system of equations (4) by the constant, √8, gives the following equivalent system of equations.

$$\begin{vmatrix} c'_0 \\ c'_4 \end{vmatrix} = \begin{vmatrix} 1 & 1 \\ 1 & -1 \end{vmatrix} \cdot e_e; \quad (5)$$

$$\begin{vmatrix} c'_2 \\ c'_6 \end{vmatrix} = \begin{vmatrix} 0.5412 & 1.3066 \\ -1.3066 & 0.5412 \end{vmatrix} \cdot e_o; \text{ and}$$

$$\begin{vmatrix} c'_1 \\ c'_3 \\ c'_5 \\ c'_7 \end{vmatrix} = B'_o \cdot o; \text{ where}$$

$B_o' = \sqrt{8} B_o.$

Figure 4:
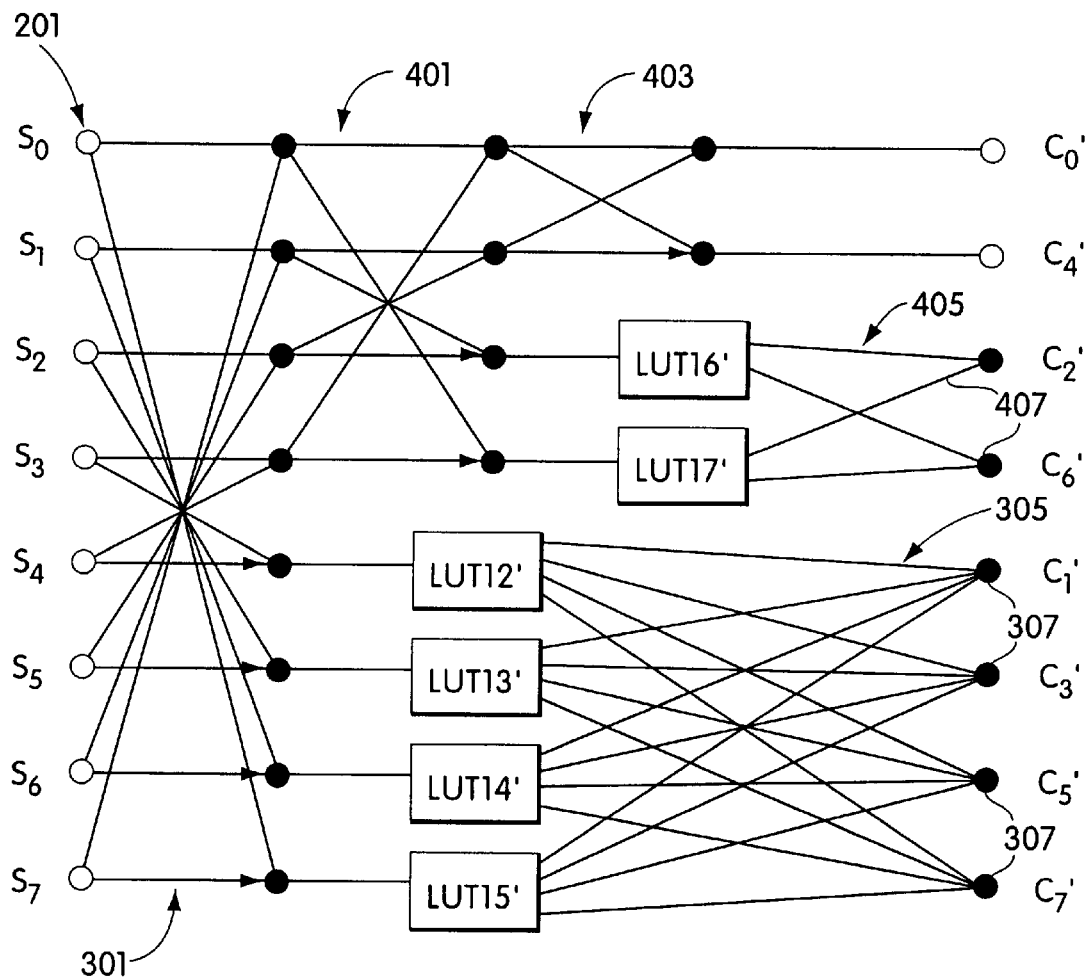
FIG. 4 is a signal flow graph of a DCT method according to yet another aspect of the present invention, employing even/odd decomposition and six look-up tables.

The system of equations (5) are represented as the signal flow graph shown in FIG. 4. The method according to this aspect of the present invention is now described in greater detail.

As with that aspect of the present invention described in connection with FIGS. 3A and 3B, this method begins with a vector butterfly 301 of the upper and lower half-vectors of s. The resulting vector, o, containing the odd portion, is processed as described above. That is, the values in vector o are applied to look-up tables LUT12' LUT13', LUT14', and LUT15' to produce values 305, which are summed in summing nodes 307 to produce output coefficients $c_1'$, $c_3'$, $C_5'$, and $c_7'$.

The other vector resulting from the butterfly 301, e, containing the even portion, is processed as follows. The vector e is divided in half and another vector butterfly 401 is performed on the halves, so as to produce an even-even vector, $e_e$, and an even-odd vector, $e_o$. In the case of the 1D 8-DCT illustrated here, the vector $e_e$ has only two entries. Simple scalar butterfly 403 is performed on those entries to produce output coefficients $c_0'$ and $c_4'$. As noted above, these output coefficients $c_0'$ and $c_4'$ are too large by a factor of $\sqrt{8}$ compared to $c_0$ and $c_4$, but this may be compensated for in subsequent processing of the output signal vector, c'.

The remaining output coefficients $c_2'$ and $c_6'$ are computed from $e_o$ using look-up tables LUT16' and LUT17'. Output values 405 from look-up tables LUT16' and LUT17' are summed in summing nodes 407 to produce output coefficients $c_2'$ and $c_6'$.

The computational efficiency of this aspect of the present invention is superior to the above-described aspects of the present invention. Only 28 additions and subtractions are required. The memory requirements for the six look-up tables are less than those for the eight tables employed in the above-described aspects. Look-up tables LUT12'–LUT15', simply occupy half the space occupied by look-up tables LUT8–LUT15, 16 k bytes. Due to the two butterfly operations performed to obtain the inputs to look-up tables LUT16' and LUT17', these tables must have an input precision of two bits greater than the original input samples $s_i$, or 10 bits precision. Thus, these tables are:

1024 entries/table×2 tables×2 output values/entry×2 bytes/output value=8 k bytes.

The total look-up table storage space is 24 k bytes.

This aspect of the present invention may be combined with any one or more of the variations described above with respect to the first aspect of the invention. That is, the look-up tables may be reduced in size by reuse of values, parallel accumulation may reduce the number of additions and subtractions required, the vernier technique may reduce table sizes, and multiple-entry tables may reduce the number of table look-ups and additions required. How to apply each of these variations to this aspect of the present invention should be apparent to those skilled in the art, in view of the explanation given above with respect to the first aspect of the present invention.

Methods according to several aspects of the present invention for performing 1D 8-DCTs have now been described. However, images are two-dimensional structures, and therefore, applications such as image compression require the performance of 2D DCTs. Therefore, extension of the above methods to 2D 8×8-DCTs are now described.

The 2D DCT is "separable" into a horizontal 1D DCT and a vertical 1D DCT. That is, the 2D DCT can be performed by first performing a DCT along one dimension of a block and subsequently performing a DCT along the other dimension of the result of the first DCT. Another way to describe this is that the process is comprised of cascading two 1D DCTs, each of the 1D DCTs performed along orthogonal members of a block to be transformed.

In order to successfully apply the above described methods for 1D DCTs to a separable 2D DCT, the intermediate result output by the first 1D DCT must have a precision which is limited to the input precision of the second 1D DCT of the cascade. This may be readily achieved by limiting the precision of the outputs of the look-up tables of the first 1D DCT and by appropriately selecting the sizes of the look-up table in the second 1D DCT. For optimum accuracy, sufficient significant bits should be provided at each stage of the method, so that some rounding is performed before transferring a result from one stage to the next. The advantage provided by rounding, described above in connection with parallel accumulation, applies here as well.

It should be noted that a 2D 8×8-DCT performed by cascading two iterations of the method of FIG. 4 produces output coefficients scaled by a constant factor of $\sqrt{8} \times \sqrt{8} = 8$. A factor of eight may be simply factored out by performing a binary shift of three bits. Thus, the scale factor is of little practical consequence in actual two-dimensional applications.

Having now described aspects of the present invention pertinent to DCTs, aspects of the present invention pertaining to IDCTs will next be described. In typical applications of DCTs and IDCTs, such as the image compression standards discussed above, the number of input values to the IDCT is limited to fewer than 1,024 magnitude values, not including the sign. Therefore, for the purposes of the following discussion it will be assumed that each input value may take on one of 1,024 distinct values, recognizing that in other applications a different number of values may be employed.

Figure 5:
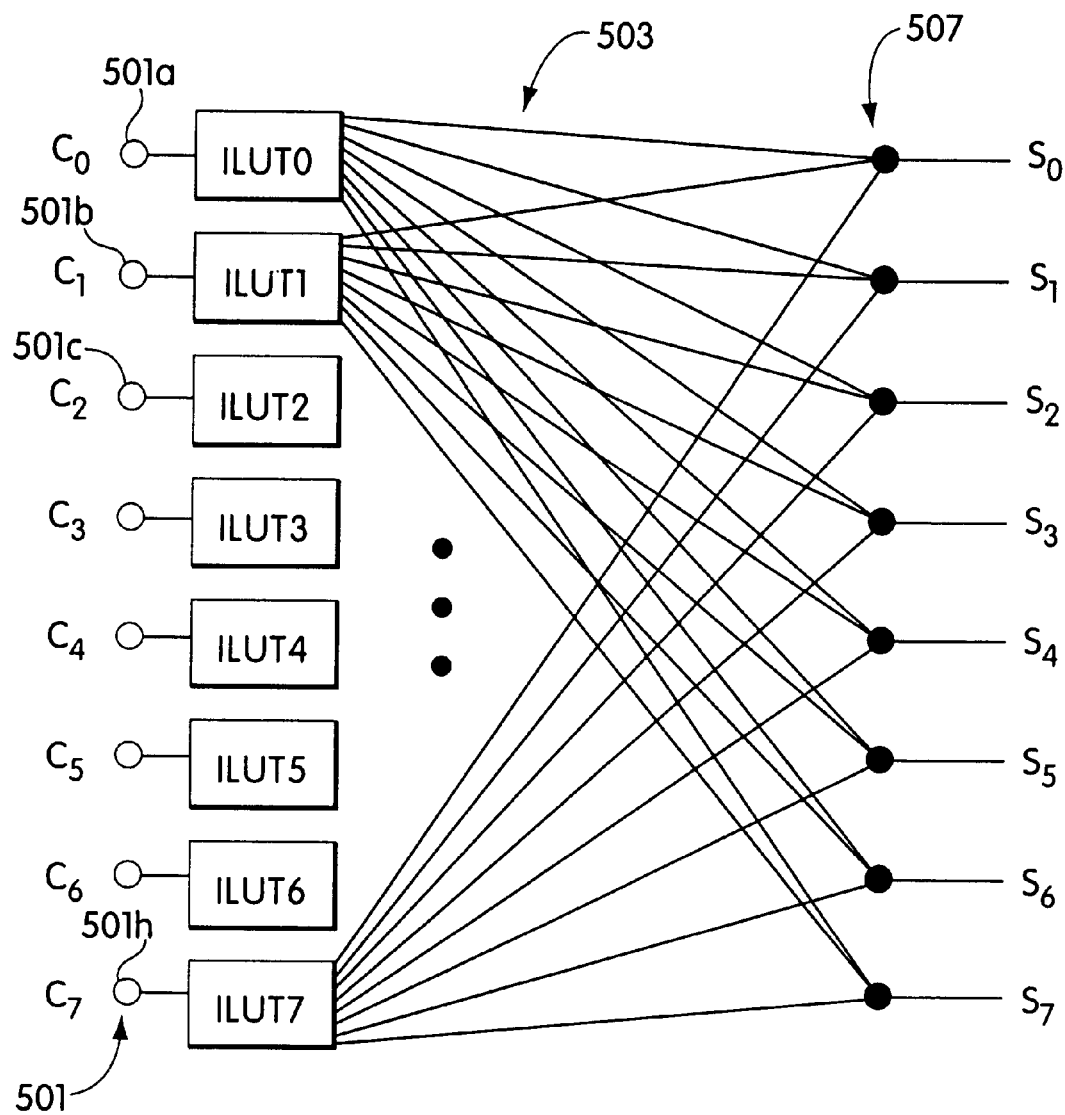
FIG. 5 is a signal flow graph of an IDCT method corresponding to the DCT method of FIG. 2.
Figure 6:
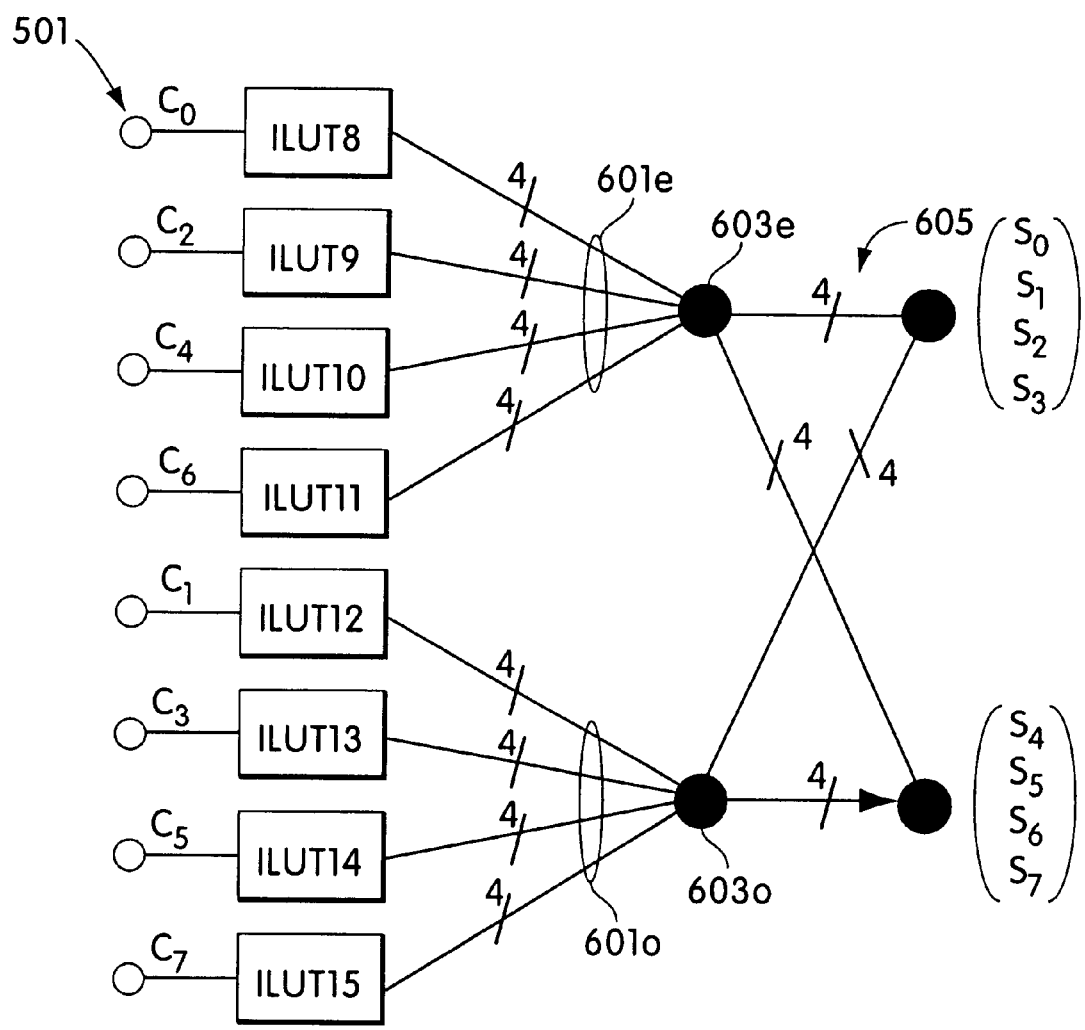
FIG. 6 is a signal flow graph of an IDCT method corresponding to the DCT method of FIGS. 3A and 3B.

The 1D 8-IDCT methods of FIGS. 5 and 6 will first be briefly described. Then, a more efficient 2D 8×8-IDCT method will be described in connection with the signal flow graph of FIG. 7.

Figure 2:
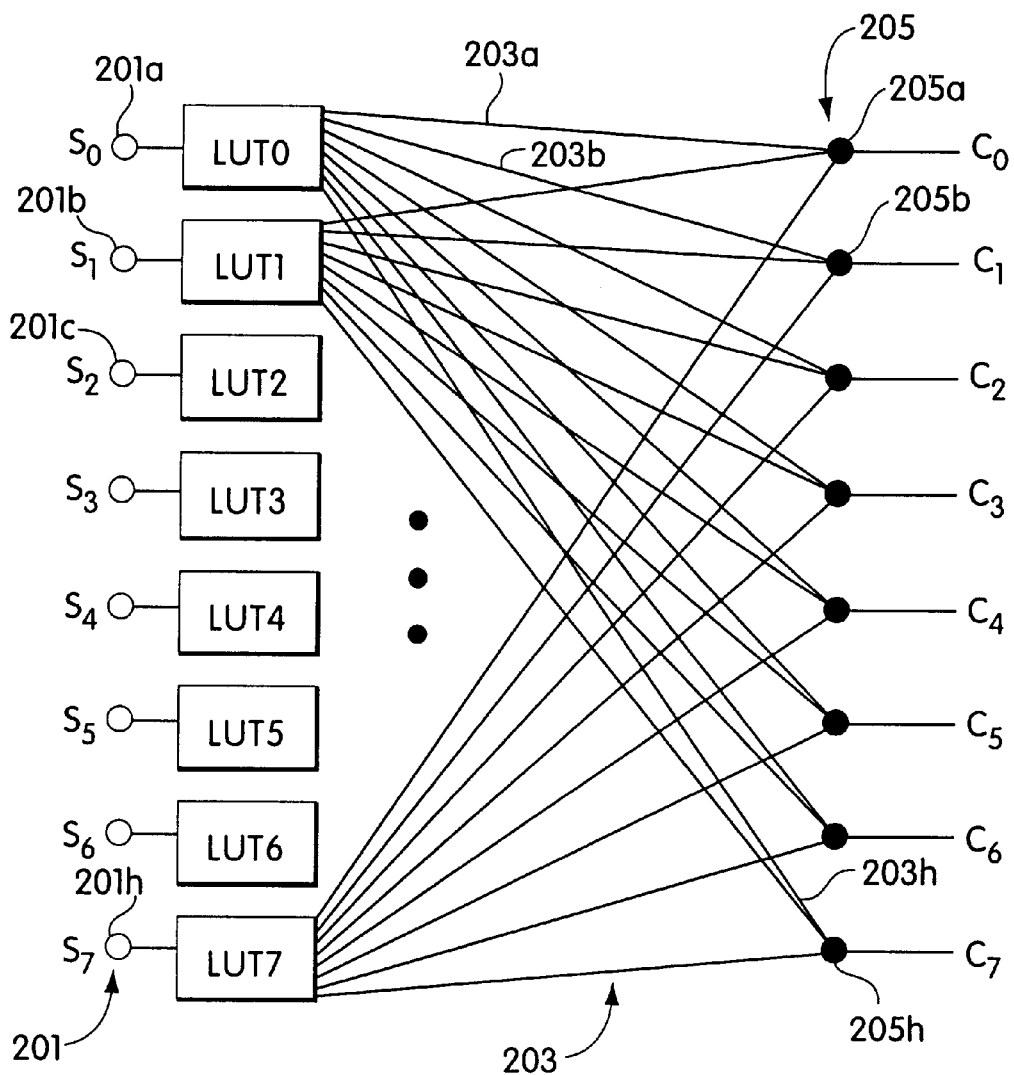
FIG. 2 is a signal flow graph of a DCT method according to one aspect of the present invention, employing eight look-up tables.

FIG. 5 shows a-flow graph of an IDCT method corresponding to the DCT method of the flow graph of FIG. 2. Although these flow graphs appear superficially similar, the contents of the look-up tables ILUT0–ILUT7 must differ from the contents of look-up tables LUT0–LUT7. Specifically, while look-up tables LUT0–LUT7 contain scaled column vectors of the DCT matrix A, look-up tables ILUT0–ILUT7 contain scaled rows of the DCT matrix A, which represent scaled DCT basis functions. The input to the IDCT flow graph shown in FIG. 5 is the vector c, containing elements $c_0, c_1, \ldots, c_7$. The elements $c_i$ are coefficients of the basis functions of a 1D 8-DCT. They are received into input buffers 501a, 501b, . . . 501h, collectively designated as input buffers 501. Each coefficient $c_i$ is used as an address to retrieve an entry from a corresponding look-up table ILUT0, ILUT1, . . . ILUT7. Values output by the look-up tables 503 are summed in summing nodes 507 to form the output vector s.

The combining of outputs 503 from look-up tables ILUT0–ILUT7 is performed as described in connection with combining outputs 203 in the flow graph of FIG. 2. Some similar properties exist between the flow graphs of FIG. 2 and FIG. 5, which may be exploited. For example, this aspect of the present invention may be combined with any one or more of the variations described above with respect to the first aspect of the invention. That is, the look-up tables may be reduced in size by reuse of values, parallel accumulation may reduce the number of additions and subtractions required, the vernier technique may reduce table sizes, and multiple-entry tables may reduce the number of table look-ups and additions required. How to apply each of these variations to this aspect of the present invention should be apparent to those skilled in the art, in view of the explanation given above with respect to the first aspect of the present invention. Furthermore, the basic odd/even symmetry of the DCT and IDCT may be exploited as shown in the flow graph of FIG. 6.

Examination of the input vector c to the flow graph of FIG. 6 reveals that the elements have been arranged in a different order from those of the flow graph of FIG. 5. This rearrangement, of course, matches the output order of the flow graphs of FIGS. 3A and 3B. Indeed, the flow graph of FIG. 6 effectively reverses the processes illustrated in the flow graphs of FIGS. 3A and 3B. Each of the even DCT coefficients $c_0$, $c_2$, $c_4$ and $c_6$ are applied to a corresponding one of the four look-up tables ILUT8–ILUT11, respectively. Each look-up table produces four values 601e. Each of the four odd coefficients $c_1$, $c_3$, $c_5$ and $c_7$ are applied to a corresponding one of the four look-up tables ILUT12–ILUT15, respectively. These look-up tables produce four values each 601o. The even values 601e are summed to produce a four-dimensional even vector at a summing node 603e. Likewise, the odd values 601o are summed at a summing node 603o to produce a four-dimensional odd vector. A four-dimensional vector butterfly 605 is then performed on the vectors 603e and 603o to produce the output signal sample vector s.

The IDCT has symmetries which may be exploited, as illustrated in connection with the flow diagram of FIG. 7 and image block of FIG. 8. This aspect of the present invention exploits symmetries found in the 2D 8×8-IDCT. Furthermore, the statistical characteristics of the input coefficients to the 2D 8×8-IDCT provide an additional advantage to performing the 2D 8×8-IDCT as discussed below. Namely, most of the input coefficients are usually zero. If two 1D 8-IDCTs are cascaded to provide the 2D 8×8-IDCT, then the first IDCT only requires a small number of additions, corresponding to the number of non-zero input coefficients. However, the second IDCT will probably require all possible additions to be performed. But, by performing the 2D 8×8-IDCT directly, only the additions corresponding to the non-zero input coefficients are required. This is discussed in further detail below.

As described above in connection with the performance of 2D DCTs, the 2D DCT is performed by performing a 1D DCT along one dimension of an image block followed by performing a 1D DCT along the orthogonal dimension of an image block. The result of such an operation is a two-dimensional array of DCT coefficients, rather than the one-dimensional output vector of DCT coefficients commonly associated with performing a 1D DCT on an input vector. The elements of such a coefficient array, C, may be designated by the use of two indices, i and j, in the form $C_{ij}$.

It is now observed that the array of coefficients C may be divided into four groups on the basis of the symmetry displayed by the 2D basis functions in those groups. That is, in the horizontal dimension of the array, basis functions display either odd symmetry or even symmetry, and likewise in the vertical dimension of the array basis functions display either odd symmetry or even symmetry. The symmetry classes displayed simply correspond to the even and odd indices of the array of coefficients C. Thus, the four symmetry classes are as follows: 1) i-even, j-even; 2) i-even, j-odd; 3) i-odd, j-even; and 4) i-odd, j-odd. In essence, by exploiting the four symmetry classes, the method illustrated by the flow graph of FIG. 6 may be expanded to perform a 2D 8×8-IDCT in accordance with the flow graph of FIG. 7.

Figure 7:
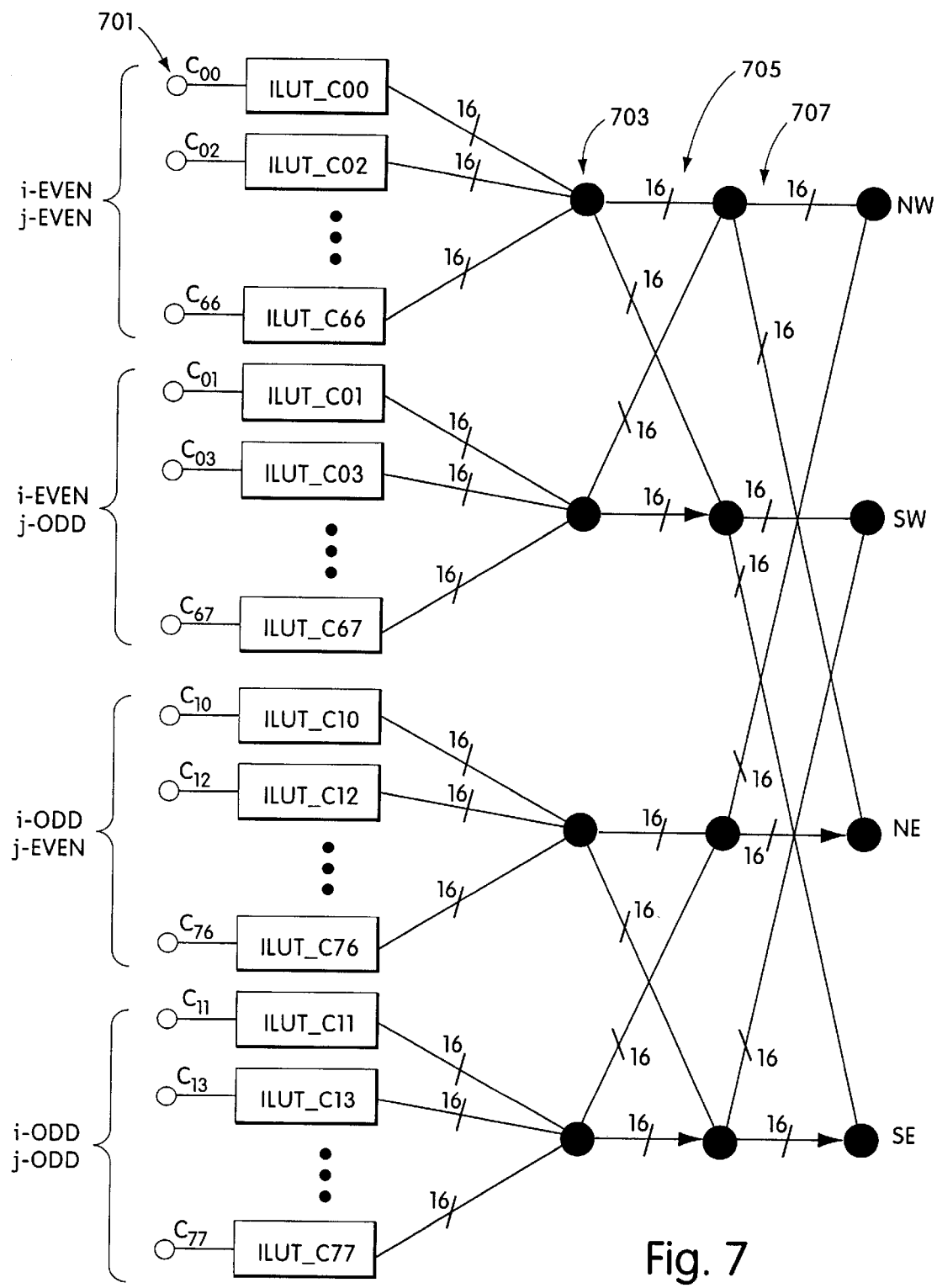
FIG. 7 is a signal flow graph of a 2D IDCT method according to another aspect of the present invention.
Figure 8:
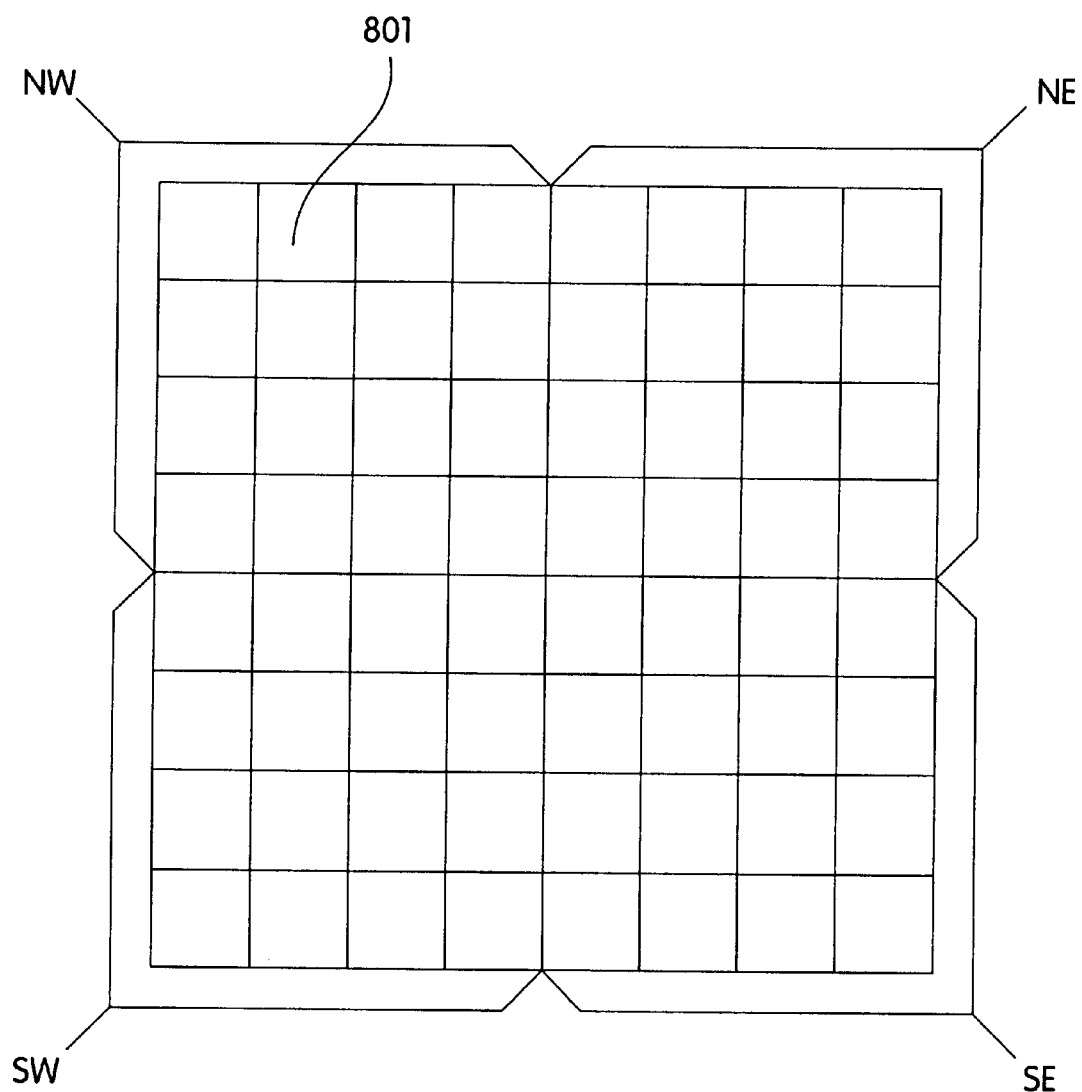
FIG. 8 is a two-dimensional image block illustrating the symmetries exploited in the method of FIG. 7.

As seen in FIG. 7, the coefficients in input array C are received in input buffers 701, grouped in accordance with their symmetry classes. Each input coefficient $C_{ij}$ is thus applied as an address to a look-up table ILUT_$C_{ij}$. Summing nodes 703 corresponding to each symmetry class then produce sixteen-dimensional output vectors corresponding to the respective symmetry classes. Two sets of butterflies 705 and 707 are then performed to produce 4×4 blocks corresponding to the four quadrants of an 8×8 image block, such as illustrated in FIG. 8. Input coefficients having i-even, j-even symmetry produce the NW block of FIG. 8; while input coefficients having i-even, j-odd symmetry produce the SW block; input coefficients having i-odd, j-even symmetry produce the NE block; and input coefficients having i-odd, j-odd symmetry produce the SE block. Each box, for example 801, of the image block illustrated in FIG. 8 contains a signal sample value computed from the input coefficient array C, and suitable for further processing as part of a digital image signal. For example, the digital image signal may be used by a display device to cause the display to produce particular luminances at particular pixels, or the digital image signal may be subject to further signal processing under the protocols of the MPEG standard, the JPEG proposed standard, or the H.261 recommendation.

The storage requirements and computational efficiency of this aspect of the present invention is as follows. For example, there are 1,024 possible input values in this example as noted above, sixty-four basis functions, requiring sixty-four tables, and sixteen output values required from each entry in a table. Thus, the storage required for all the look-up tables ILUT_$C_{ij}$ is:

1024 entries/table×64 tables×16 values/entry×2 bytes/value=2M bytes, assuming two byte output sample precision. The vernier variation described above is particularly advantageous for the tables used in this aspect of the present invention.

Expanding each pattern individually, and mirroring it horizontally and vertically with any needed sign change, and finally accumulating the output sample value requires: 64× (NZC−1) additions and subtractions per 8×8 block, where NZC is the number of non-zero coefficients in the input coefficient array. However, by exploiting the four symmetry classes as shown in the flow graph of FIG. 7, there are only 16×(NZC−4) additions and subtractions per block in the summing nodes 703, provided non-zero coefficients occur in all symmetry classes. The worst case occurs when all non-zero coefficients happen to occur within one symmetry class. Then, 16×(NZC−1) additions and subtractions per block are required. Finally, the 4×4 blocks are combined by the butterflies 705 and 707, which require 2×4×16=128 additions and subtractions. Thus, the total computational requirement for this aspect of the present invention is typically 16×NZC+64 additions and subtractions per 8×8 block provided non-zero coefficients occur in all symmetry classes. In the worst case, where the number of non-zero coefficients is 64, the total number of additions and subtractions per 8×8 block is 17×64 =1088.

It is assumed throughout the above discussion that input values of zero may be detected and corresponding additions and subtractions simply omitted.

As discussed above, parallel accumulation of values in a single large register of a CPU may be used to reduce the total number of additions and subtractions performed by the CPU.

The present invention has been described and illustrated in connection with a number of specific examples. However, the foregoing description is not to be taken as limiting. Numerous variations and modifications contemplated as within the scope of the invention should now occur to those skilled in the art. Therefore, the scope of the invention is not to be limited except by the scope of the appended claims.

What is claimed is:

1. A method of producing in a computer including a processing unit and a memory an output signal including a plurality of digitized signal samples by performing an Inverse Discrete Cosine Transform of an input signal including groups of N input coefficients, each input coefficient classifiable into one of a plurality of symmetry classes, the method comprising the steps of:

precomputing for each of N look up tables, a plurality of table values equal in number to a number of possible input coefficient amplitude values times N divided by a number of symmetry classes, each table value corresponding to multiplication of an input coefficient value by a transform basis vector element so as to produce a term in one of the plurality of output signal samples;

storing the precomputed plurality of table values in the memory of the computer at addresses corresponding to the possible input coefficient amplitude values, in the N look up tables containing a plurality of entries;

receiving the plurality of input coefficients into a corresponding plurality of buffers in the memory of the computer;

operating the processing unit to look up in the at least one look up table, entries corresponding to each of the plurality of received input coefficients; and operating the processing unit to accumulate a plurality of sums of entries looked up corresponding to each output signal sample, the step of accumulating further including the steps of summing results segregated by the symmetry classes into which the input coefficients are classified, and performing at least one vector butterfly operation corresponding to the plurality of symmetry classes, so as to combine segregated results into the output signal; wherein the step of precomputing is performed prior to all occurrences of the step of operating the processing unit to look up.

2. The method of claim 1, wherein there are four symmetry classes.

3. The method of claim 1 or 2, wherein the step of precomputing further comprises the step of:

merging look up tables to form merged look up tables in which each merged look-up table is addressed with a plurality of input coefficients.

4. The method of claim 1 or 2, wherein the step of precomputing further comprises the steps of:

identifying redundant table values corresponding to an input coefficient value, wherein the redundant table values have a same magnitude;

omitting storage of all but one redundant table value.

5. The method of claim 4, wherein the step of looking up further comprises the step of:

mapping redundant table values not stored onto another redundant table value; and correcting mapped redundant table values for a sign difference relative to the other redundant table value.

6. The method of claim 1 or 2, wherein the step of accumulating further comprises the step of:

simultaneously adding and subtracting values corresponding to a plurality of output samples within a single register having greater precision than the precision of the output sample.

7. The method of claim 6, wherein the step of precomputing further comprises the steps of:

adjusting values of each table by an amount sufficient to compensate for an expected overflow error.

8. The method of claim 7, further comprising the steps of:

further adjusting values of one table by a predetermined fixed amount; and truncating to a fixed precision the output samples accumulated, whereby rounding is effected.

9. The method of claim 7, wherein the step of simultaneously adding and subtracting further comprises the step of:

performing two's complement arithmetic on values having both an integer part and a fractional part.

10. The method of claim 1 or 2, wherein the input coefficient is divisible into a most significant portion and a least significant portion, and wherein the step of precomputing further comprises the steps of:

precomputing at least one table addressable by the most significant portion of the input coefficient, having entries corresponding to a contribution by the most significant portion of the input coefficient to each output sample; and precomputing at least one table addressable by the least significant portion of the input coefficient, having entries corresponding to a contribution by the least significant portion of the input coefficient to each output sample.

11. A digital signal processing apparatus for performing an inverse discrete cosine transform, comprising:

means for receiving a digital input signal including a sequence of input transform coefficient values;

a memory containing look up tables having a number of entries equal to a number of possible input transform coefficient values, and corresponding to values of Inverse Discrete Cosine Transform basis functions stored at addresses corresponding to all possible input transform coefficient values;

means for outputting a digital output signal including a sequence of output values;

a central processing unit operatively connected to the means for receiving, to the memory and to the means for outputting; and a control store of central processing unit instructions connected so as to provide the instructions to the central processing unit, the control store containing instructions to address the memory containing look up tables as a function of input transform coefficient values received by the means for receiving, instructions to sum values obtained by addressing the memory so as to form output values, and instructions to provide the output values to the means for outputting, the instructions to sum values including instructions to sum values to obtain parts of the output values corresponding to a plurality of symmetry classes; and instructions to sum values using at least one vector butterfly to obtain the output values.

12. A method of producing in a computer including a processing unit, a memory and an input/output system an output signal including a plurality of output coefficients by performing a forward Discrete Cosine Transform of a digitized input signal including groups of N samples, S where N is even, the method comprising the steps of:

receiving the groups of N samples through the input/output system into a corresponding plurality of buffers;

executing instructions on the processing unit to decompose the received plurality of input signal samples into an odd portion including a plurality of odd amplitude values and an even portion including a plurality of even amplitude values;

precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;

storing the precomputed plurality of table values in the memory of the computer at addresses corresponding to the possible odd amplitude values, in the N/2 look up tables addressable by the plurality of odd amplitude values;

executing instructions on the processing unit to look up in the N/2 look up tables, entries corresponding to each of the N/2 odd values;

executing instructions on the processing unit to accumulate odd output coefficients as a plurality of sums of entries looked up corresponding to each of the odd output coefficients;

executing instructions on the processing unit to compute even output coefficients; and outputting as the output signal a sequence of accumulated odd and computed even output coefficients; wherein the step of precomputing is performed prior to all occurrences of the step of operating the processing unit to look up, wherein the step of operating the processing unit to accumulate further comprises the step of:

loading a first plurality of values corresponding to a plurality of output coefficients into distinct locations within a single register having greater precision than the precision of each output coefficient; and performing in a single operation an accumulation of a second plurality of values with the first plurality of values within the single register; whereby a plurality of output values are accumulated in the single register, simultaneously.

13. The method of claim 12, wherein the step of precomputing further comprises the steps of:

adjusting values of each table by an amount sufficient to compensate for an expected overflow error.

14. The method of claim 13, further comprising the steps of:

further adjusting values of one table by a predetermined fixed amount; and truncating to a fixed precision the output coefficients accumulated, whereby rounding is effected.

15. The method of claim 13, wherein the step of simultaneously adding and subtracting further comprises the step of:

performing two's complement arithmetic on values having both an integer part and a fractional part.

16. A method of producing in a computer including a processing unit, a memory and an input/output system an output signal including a plurality of output coefficients by performing a forward Discrete Cosine Transform of a digitized input signal including groups of N samples, where N is even, wherein the digital input sample is divisible into a most significant portion and a least significant portion, the method comprising the steps of:

receiving the groups of N samples through the input/output system into a corresponding plurality of buffers;

executing instructions on the processing unit to decompose the received plurality of input signal samples into an odd portion including a plurality of odd amplitude values and an even portion including a plurality of even amplitude values;

precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;

storing the precomputed plurality of table values in the memory of the computer at addresses corresponding to the possible odd amplitude values, in the N/2 look up tables addressable by the plurality of odd amplitude values;

executing instructions on the processing unit to look up in the N/2 look up tables, entries corresponding to each of the N/2 odd values;

executing instructions on the processing unit to accumulate odd output coefficients as a plurality of sums of entries looked up corresponding to each of the odd output coefficients;

executing instructions on the processing unit to compute even output coefficients; and outputting as the output signal a sequence of accumulated odd and computed even output coefficients; wherein the step of precomputing is performed prior to all occurrences of the step of operating the processing unit to look up, and wherein the step of precomputing further comprises the steps of:

precomputing at least one table addressable by the most significant portion of the digital input sample, having entries corresponding to a contribution by the most significant portion of the digital input sample to each output coefficient; and precomputing at least one table addressable by the least significant portion of the digital input sample, having entries corresponding to a contribution by the least significant portion of the digital input sample to each output coefficient; and wherein the step of operating the processing unit to look up further comprises the steps of:

adding a bias value to the amplitude values when the input sample is signed; and addressing the at least one table addressable by the most significant portion of the input samples only when the input sample exceeds a predetermined threshold.

17. A method of producing in a computer including a processing unit, a memory and an input/output system an output signal including a plurality of output coefficients by performing a forward Discrete Cosine Transform of a digitized input signal including groups of N samples, where N is even, the method comprising the steps of:

receiving the groups of N samples through the input/output system into a corresponding plurality of buffers;

executing instructions on the processing unit to decompose the received plurality of input signal samples into an odd portion including a plurality of odd amplitude values and an even portion including a plurality of even amplitude values;

precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;

storing the precomputed plurality of table values in the memory of the computer at addresses corresponding to the possible odd amplitude values, in the N/2 look up tables addressable by the plurality of odd amplitude values;

executing instructions on the processing unit to look up in the N/2 look up tables, entries corresponding to each of the N/2 odd values;

executing instructions on the processing unit to accumulate odd output coefficients as a plurality of sums of entries looked up corresponding to each of the odd output coefficients;

executing instructions on the processing unit to compute even output coefficients; and outputting as the output signal a sequence of accumulated odd and computed even output coefficients; wherein the step of precomputing is performed prior to all occurrences of the step of operating the processing unit to look up, wherein the step of executing instructions on the processing unit to compute further comprises the steps of:

looking up in the at least one look-up table, entries corresponding to the plurality of even amplitude values; and accumulating the even output coefficients as a plurality of sums of corresponding table values, wherein the step of operating the processing unit to accumulate further comprises the step of:

loading a first plurality of values corresponding to a plurality of output coefficients into distinct locations within a single register having greater precision than the precision of each output coefficient; and performing in a single operation an accumulation of a second plurality of values with the first plurality of values within the single register; whereby a plurality of output values are accumulated in the single register, simultaneously.

18. The method of claim 17, wherein the step of precomputing further comprises the steps of:

adjusting values of each table by an amount sufficient to compensate for an expected overflow error.

19. The method of claim 18, further comprising the steps of:

further adjusting values of one table by a predetermined fixed amount; and truncating to a fixed precision the output coefficients accumulated, whereby rounding is effected.

20. The method of claim 18, wherein the step of simultaneously adding and subtracting further comprises the step of:

performing two's complement arithmetic on values having both an integer part and a fractional part.

21. A method of producing in a computer including a processing unit, a memory and an input/output system an output signal including a plurality of output coefficients by performing a forward Discrete Cosine Transform of a digitized input signal including groups of N samples, where N is even, wherein the digital input sample is divisible into a most significant portion and a least significant portion, the method comprising the steps of:

receiving the groups of N samples through the input/output system into a corresponding plurality of buffers;

executing instructions on the processing unit to decompose the received plurality of input signal samples into an odd portion including a plurality of odd amplitude values and an even portion including a plurality of even amplitude values;

precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;

storing the precomputed plurality of table values in the memory of the computer at addresses corresponding to the possible odd amplitude values, in the N/2 look up tables addressable by the plurality of odd amplitude values;

executing instructions on the processing unit to look up in the N/2 look up tables, entries corresponding to each of the N/2 odd values;

executing instructions on the processing unit to accumulate odd output coefficients as a plurality of sums of entries looked up corresponding to each of the odd output coefficients;

executing instructions on the processing unit to compute even output coefficients; and outputting as the output signal a sequence of accumulated odd and computed even output coefficients; wherein the step of precomputing is performed prior to all occurrences of the step of operating the processing unit to look up, wherein the step of executing instructions on the processing unit to compute further comprises the steps of:

looking up in the at least one look-up table, entries corresponding to the plurality of even amplitude values; and accumulating the even output coefficients as a plurality of sums of corresponding table values, and wherein the step of precomputing further comprises the steps of:

precomputing at least one table addressable by the most significant portion of the digital input sample, having entries corresponding to a contribution by the most significant portion of the digital input sample to each output coefficient; and precomputing at least one table addressable by the least significant portion of the digital input sample, having entries corresponding to a contribution by the least significant portion of the digital input sample to each output coefficient; and wherein the step of operating the processing unit to look up further comprises the steps of:
adding a bias value to the amplitude values when the input sample is signed; and
addressing the at least one table addressable by the most significant portion of the input samples only when the input sample exceeds a predetermined threshold.

22. A method of producing in a computer including a processing unit, a memory and an input/output system an output signal including a plurality of output coefficients by performing a forward Discrete Cosine Transform of a digitized input signal including groups of N samples, where N is even, the method comprising the steps of:
receiving the groups of N samples through the input/output system into a corresponding plurality of buffers;
executing instructions on the processing unit to decompose the received plurality of input signal samples into an odd portion including a plurality of odd amplitude values and an even portion including a plurality of even amplitude values;
precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;
storing the precomputed plurality of table values in the memory of the computer at addresses corresponding to the possible odd amplitude values, in the N/2 look up tables addressable by the plurality of odd amplitude values;
executing instructions on the processing unit to look up in the N/2 look up tables, entries corresponding to each of the N/2 odd values;
executing instructions on the processing unit to accumulate odd output coefficients as a plurality of sums of entries looked up corresponding to each of the odd output coefficients;
executing instructions on the processing unit to compute even output coefficients; and
outputting as the output signal a sequence of accumulated odd and computed even output coefficients; wherein the step of precomputing is performed prior to all occurrences of the step of operating the processing unit to look up, wherein N is a multiple of 8, and wherein the step of executing instructions on the processing unit to compute further comprises the steps of:
further decomposing the plurality of even values into N/4 even-even values and N/4 even-odd values;
performing a butterfly operation on the plurality of N/4 even-even values; and
obtaining from N/4 of the look-up tables, entries corresponding to each of the N/4 even-odd values; and
forming an even-odd portion of the plurality of output coefficients as a plurality of sums of corresponding table values, wherein the step of operating the processing unit to accumulate further comprises the step of:
loading a first plurality of values corresponding to a plurality of output coefficients into distinct locations within a single register having greater precision than the precision of each output coefficient; and
performing in a single operation an accumulation of a second plurality of values with the first plurality of values within the single register; whereby a plurality of output values are accumulated in the single register, simultaneously.

23. The method of claim 22, wherein the step of precomputing further comprises the steps of:
adjusting values of each table by an amount sufficient to compensate for an expected overflow error.

24. The method of claim 23, further comprising the steps of:
further adjusting values of one table by a predetermined fixed amount; and
truncating to a fixed precision the output coefficients accumulated, whereby rounding is effected.

25. The method of claim 23, wherein the step of simultaneously adding and subtracting further comprises the step of:
performing two's complement arithmetic on values having both an integer part and a fractional part.

26. A method of producing in a computer including a processing unit, a memory and an input/output system an output signal including a plurality of output coefficients by performing a forward Discrete Cosine Transform of a digitized input signal including groups of N samples, where N is even, wherein the digital input sample is divisible into a most significant portion and a least significant portion, the method comprising the steps of:
receiving the groups of N samples through the input/output system into a corresponding plurality of buffers;
executing instructions on the processing unit to decompose the received plurality of input signal samples into an odd portion including a plurality of odd amplitude values and an even portion including a plurality of even amplitude values;
precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;
storing the precomputed plurality of table values in the memory of the computer at addresses corresponding to the possible odd amplitude values, in the N/2 look up tables addressable by the plurality of odd amplitude values;
executing instructions on the processing unit to look up in the N/2 look up tables, entries corresponding to each of the N/2 odd values;
executing instructions on the processing unit to accumulate odd output coefficients as a plurality of sums of entries looked up corresponding to each of the odd output coefficients;
executing instructions on the processing unit to compute even output coefficients; and
outputting as the output signal a sequence of accumulated odd and computed even output coefficients; wherein the step of precomputing is performed prior to all occurrences of the step of operating the processing unit to look up, wherein N is a multiple of 8, and wherein the step of executing instructions on the processing unit to compute further comprises the steps of:
further decomposing the plurality of even values into N/4 even-even values and N/4 even-odd values;
performing a butterfly operation on the plurality of N/4 even-even values; and
obtaining from N/4 of the look-up tables, entries corresponding to each of the N/4 even-odd values; and forming an even-odd portion of the plurality of output coefficients as a plurality of sums of corresponding table values, and wherein the step of precomputing further comprises the steps of:

precomputing at least one table addressable by the most significant portion of the digital input sample, having entries corresponding to a contribution by the most significant portion of the digital input sample to each output coefficient; and precomputing at least one table addressable by the least significant portion of the digital input sample, having entries corresponding to a contribution by the least significant portion of the digital input sample to each output coefficient; and wherein the step of operating the processing unit to look up further comprises the steps of:

adding a bias value to the amplitude values when the input sample is signed; and addressing the at least one table addressable by the most significant portion of the input samples only when the input sample exceeds a predetermined threshold.

27. A method of producing in a computer including a processing unit, a memory and an input/output system an output signal including a plurality of output coefficients by performing a forward Discrete Cosine Transform of a digitized input signal including groups of N samples, where N is even, the method comprising the steps of:

receiving the groups of N samples through the input/output system into a corresponding plurality of buffers;

executing instructions on the processing unit to decompose the received plurality of input signal samples into an odd portion including a plurality of odd amplitude values and an even portion including a plurality of even amplitude values;

precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;

storing the precomputed plurality of table values in the memory of the computer at addresses corresponding to the possible odd amplitude values, in the N/2 look up tables addressable by the plurality of odd amplitude values;

executing instructions on the processing unit to look up in the N/2 look up tables, entries corresponding to each of the N/2 odd values;

executing instructions on the processing unit to accumulate odd output coefficients as a plurality of sums of entries looked up corresponding to each of the odd output coefficients;

executing instructions on the processing unit to compute even output coefficients; and outputting as the output signal a sequence of accumulated odd and computed even output coefficients; wherein the step of precomputing is performed prior to all occurrences of the step of operating the processing unit to look up, wherein the step of executing instructions on the processing unit to decompose further comprises performing a butterfly operation on the plurality of input signal samples, wherein the step of operating the processing unit to accumulate further comprises the step of:

loading a first plurality of values corresponding to a plurality of output coefficients into distinct locations within a single register having greater precision than the precision of each output coefficient; and performing in a single operation an accumulation of a second plurality of values with the first plurality of values within the single register; whereby a plurality of output values are accumulated in the single register, simultaneously.

28. The method of claim 27, wherein the step of precomputing further comprises the steps of:

adjusting values of each table by an amount sufficient to compensate for an expected overflow error.

29. The method of claim 28, further comprising the steps of:

further adjusting values of one table by a predetermined fixed amount; and truncating to a fixed precision the output coefficients accumulated, whereby rounding is effected.

30. The method of claim 28, wherein the step of simultaneously adding and subtracting further comprises the step of:

performing two's complement arithmetic on values having both an integer part and a fractional part.

31. A method of producing in a computer including a processing unit, a memory and an input/output system an output signal including a plurality of output coefficients by performing a forward Discrete Cosine Transform of a digitized input signal including groups of N samples, where N is even, wherein the digital input sample is divisible into a most significant portion and a least significant portion, the method comprising the steps of:

receiving the groups of N samples through the input/output system into a corresponding plurality of buffers;

executing instructions on the processing unit to decompose the received plurality of input signal samples into an odd portion including a plurality of odd amplitude values and an even portion including a plurality of even amplitude values;

precomputing for each of N/2 look up tables, a plurality of table values equal in number to a number of possible odd amplitude values, each table value corresponding to multiplication of an odd amplitude value by an intermediate transform basis vector element so as to produce a term in one of the plurality of output coefficients;

storing the precomputed plurality of table values in the memory of the computer at addresses corresponding to the possible odd amplitude values, in the N/2 look up tables addressable by the plurality of odd amplitude values;

executing instructions on the processing unit to look up in the N/2 look up tables, entries corresponding to each of the N/2 odd values;

executing instructions on the processing unit to accumulate odd output coefficients as a plurality of sums of entries looked up corresponding to each of the odd output coefficients;

executing instructions on the processing unit to compute even output coefficients; and outputting as the output signal a sequence of accumulated odd and computed even output coefficients; wherein the step of precomputing is performed prior to all occurrences of the step of operating the processing unit to look up, wherein the step of executing instructions on the processing unit to decompose further comprises performing a butterfly operation on the plurality of input signal samples, and wherein the step of precomputing further comprises the steps of:

precomputing at least one table addressable by the most significant portion of the digital input sample, having entries corresponding to a contribution by the most significant portion of the digital input sample to each output coefficient; and precomputing at least one table addressable by the least significant portion of the digital input sample, having entries corresponding to a contribution by the least significant portion of the digital input sample to each output coefficient; and wherein the step of operating the processing unit to look up further comprises the steps of:

adding a bias value to the amplitude values when the input sample is signed; and addressing the at least one table addressable by the most significant portion of the input samples only when the input sample exceeds a predetermined threshold.

* * * * *